US012363350B2

(12) United States Patent
Wang et al.

(10) Patent No.: US 12,363,350 B2
(45) Date of Patent: Jul. 15, 2025

(54) NEURAL NETWORK BASED IN-LOOP FILTERING FOR VIDEO CODING

(71) Applicant: ALIBABA GROUP HOLDING LIMITED, Grand Cayman (KY)

(72) Inventors: Zhao Wang, Beijing (CN); Changyue Ma, Beijing (CN); Ru-Ling Liao, Beijing (CN); Yan Ye, San Diego, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 18/257,227

(22) PCT Filed: Jan. 19, 2021

(86) PCT No.: PCT/CN2021/072774
§ 371 (c)(1),
(2) Date: Jun. 13, 2023

(87) PCT Pub. No.: WO2022/155799
PCT Pub. Date: Jul. 28, 2022

(65) Prior Publication Data
US 2024/0048777 A1    Feb. 8, 2024

(51) Int. Cl.
*H04N 19/86*    (2014.01)
*H04N 19/176*    (2014.01)
*H04N 19/59*    (2014.01)

(52) U.S. Cl.
CPC .......... *H04N 19/86* (2014.11); *H04N 19/176* (2014.11); *H04N 19/59* (2014.11)

(58) Field of Classification Search
CPC .......................... H04N 19/86; H04N 19/176
See application file for complete search history.

(56) References Cited

U.S. PATENT DOCUMENTS

2012/0148103 A1\* 6/2012 Hampel ................. G06T 7/254
    382/103
2015/0195573 A1    7/2015 Aflaki Beni et al.
    (Continued)

FOREIGN PATENT DOCUMENTS

CN    102196272 A    9/2011
CN    110120019 A    8/2019
    (Continued)

OTHER PUBLICATIONS

"JVET software repository," https://https://jvet.hhi.fraunhofer.de/svn/syn_HMJEMSoftware/.:https://jvet.hhi.fraunhofer.de/svn/svn_HMJEMSoftware/branches/HM-13.0-QTBT/.
    (Continued)

*Primary Examiner* — Zhubing Ren
(74) *Attorney, Agent, or Firm* — Finnegan, Henderson, Farabow, Garrett & Dunner, LLP

(57) ABSTRACT

The present disclosure provides methods for performing training and executing of a multi-density neural network in video processing. An exemplary method comprises: receiving a video stream comprising a plurality of pictures; processing the plurality of pictures using a first branch of a first block in the neural network, wherein the neural network is configured to reduce blocking artifacts in video compression of the video stream and the first branch comprises one or more residual blocks; and processing the plurality of pictures using a second branch of the first block in the neural network, wherein the second branch comprises a down-sampling processing, an up-sampling processing, and one or more residual blocks.

17 Claims, 17 Drawing Sheets

(56) References Cited

U.S. PATENT DOCUMENTS

| | | | | |
|---|---|---|---|---|
| 2017/0286780 | A1* | 10/2017 | Zhang | G06F 18/2148 |
| 2021/0012537 | A1* | 1/2021 | Xu | H04N 19/136 |
| 2022/0094962 | A1* | 3/2022 | Choi | H04N 19/136 |
| 2022/0148131 | A1* | 5/2022 | Wang | G06T 3/4076 |
| 2022/0191553 | A1* | 6/2022 | Auyeung | H04N 19/436 |

FOREIGN PATENT DOCUMENTS

| | | |
|---|---|---|
| CN | 110188776 A | 8/2019 |
| CN | 111164651 A | 5/2020 |

OTHER PUBLICATIONS

Balle et al., End-to-End Optimized Image Compression, ICLR, 2017, 27 pages.

Bross et al., "Versatile Video Coding (Draft 7),"JVET-P2001-vE, 16th Meeting: Geneva, CH, Oct. 1-11, 2019, 488 pages.

Dai et al., "A Convolutional Neural Network Approach for Post-Processing in HEVC Intra Coding," in Proc. MMM, Reykjavik, Iceland, Jan. 2017, pp. 28-39.

Fu et al., "Sample Adaptive Offset in the HEVC Standard," IEEE Transactions on Circuits and Systems for Video Technology, vol. 22, No. 12, p. 1755-1764 (2012).

He et al., "Deep Residual Learning for Image Recognition," in Proceedings of the IEEE conference on computer vision and pattern recognition (pp. 770-778) (2019).

He et al., "Delving Deep into Rectifiers: Surpassing Human-Level Performance on ImageNet Classification," Proceedings of the IEEE conference on computer vision and pattern recognition, 2015, pp. 1026-1034.

International Telecommunications Union "Series H: Audiovisual and Multimedia Systems Infrastructure of audiovisual services—Coding of moving video", ITU-T Telecommunication Standardization Sector of ITU, Apr. 2013, 317 pages.

Jia et al., "Spatial-Temporal Residue Network Based In-Loop Filter for Video Coding," 2017 IEEE Visual Communications and Image Processing (VCIP), St. Petersburg, FL, 2017, pp. 1-4.

Kang et al., "Multi-model/multi-scale convolutional neural network based in-loop filter design for next generation video codec," in Proc. IEEE ICIP, 2017, pp. 26-30.

Li et al., "A deep learning approach for multi-frame in-loop filter of HEVC." IEEE Transactions on Image Processing, vol. 28, No. 11, Nov. 2019, pp. 5663-5678.

Lu et al. "DVC: An end-to-end deep video compression framework," in Proceedings of the IEEE Conference on Computer Vision and Pattern Recognition, pp. 11006-11015, 2019.

Meng et al., "A new HEVC in-loop filter based on multi-channel long-short-term dependency residual networks," in Proc. DCC, 2018, pp. 187-196.

Nair et al., "Rectified Linear Units Improve Restricted Boltzmann Machines," in Proceedings of the 27th international conference on machine learning, CML-10, pp. 807-814, 2010.

Norkin et al., "HEVC Deblocking Filter, IEEE Transactions on Circuits and Systems for Video Technology," vol. 22, No. 12, pp. 1746-1754 (2012).

Park et al., "CNN-based in-loop filtering for coding efficiency improvement," Proc. IEEE IVMSP Workshop, Jul. 2016, pp. 1-5.

PCT International Search Report and Written Opinion mailed Oct. 27, 2021, issued in corresponding International Application No. PCT/CN2021/072774 (7 pgs.).

Svoboda et al., "Compression Artifacts Removal Using Convolutional Neural Networks," Journal of WSCG, vol. 24, No. 2, pp. 65-70, 2016.

Wang et al., "Attention-Based Dual-Scale CNN In-Loop Filter for Versatile Video Coding," IEEE Access, vol. 7, 145214-145226, 2019.

Zhang et al., "Residual non-local attention networks for image restoration," arXiv preprint arXiv:1903.10082, 2019.

European Patent Office Communication issued for Application No. 21920203.3 the Supplementary European Search Report (Art. 153(7) EPC) and the European search opinion dated Sep. 2, 2024, 32 pages.

Wang et al., "AHG11: Multi-density network for in-loop filtering," JVET-U0055, $21^{st}$ Meeting, by teleconference, Jan. 6-15, 2021, 4 pages.

Alshina et al., EE Summary Report: Neural Network-based Video Coding, JVET-U0023_r1, $21^{st}$ Meeting, by teleconference, Jan. 6-15, 2021, 14 pages.

Wang et al., "EE-1.6: Neural network based in-loop filtering," JVET-U0054, $21^{st}$ Meeting, by teleconference, Jan. 6-15, 2021, 3 pages.

* cited by examiner

NEURAL NETWORK BASED IN-LOOP FILTERING FOR VIDEO CODING

CROSS-REFERENCE TO RELATED PATENT APPLICATIONS

This application is a national stage filing under 35 U.S.C. § 371 of International Application No. PCT/CN2021/072774, filed on Jan. 19, 2021, the contents of which are incorporated herein by reference in its entirety.

TECHNICAL FIELD

The present disclosure generally relates to video processing, and more particularly, to methods and systems for performing video compression and decompression.

BACKGROUND

A video is a set of static pictures (or "frames") capturing the visual information. To reduce the storage memory and the transmission bandwidth, a video can be compressed before storage or transmission and decompressed before display. The compression process is usually referred to as encoding and the decompression process is usually referred to as decoding. There are various video coding formats which use standardized video coding technologies, most commonly based on prediction, transform, quantization, entropy coding and in-loop filtering. The video coding standards, such as the High Efficiency Video Coding (e.g., HEVC/H.265) standard, the Versatile Video Coding (e.g., VVC/H.266) standard, and AVS standards, specifying the specific video coding formats, are developed by standardization organizations. With more and more advanced video coding technologies being adopted in the video standards, the coding efficiency of the new video coding standards get higher and higher.

SUMMARY OF THE DISCLOSURE

Embodiments of the present disclosure provide a method for training a neural network in video processing, the method comprises receiving a plurality of training pictures; training a first branch of a first block in the neural network using the plurality of training pictures, wherein the neural network is configured to reduce blocking artifacts in video compression and the first branch comprises one or more residual blocks; and training a second branch of the first block in the neural network using the plurality of training pictures, wherein the second branch comprises a down-sampling processing, an up-sampling processing, and one or more residual blocks.

Embodiments of the present disclosure provide a method for using a neural network in video processing, the method comprises receiving a video stream comprising a plurality of pictures; processing the plurality of pictures using a first branch of a first block in the neural network, wherein the neural network is configured to reduce blocking artifacts in video compression of the video stream and the first branch comprises one or more residual blocks; and processing the plurality of pictures using a second branch of the first block in the neural network, wherein the second branch comprises a down-sampling processing, an up-sampling processing, and one or more residual blocks.

Embodiments of the present disclosure further provide a system for training a neural network in video processing, the system comprises a memory storing a set of instructions; and a processor configured to execute the set of instructions to cause the system to perform: receiving a plurality of training pictures; training a first branch of a first block in the neural network using the plurality of training pictures, wherein the neural network is configured to reduce blocking artifacts in video compression and the first branch comprises one or more residual blocks; and training a second branch of the first block in the neural network using the plurality of training pictures, wherein the second branch comprises a down-sampling processing, an up-sampling processing, and one or more residual blocks.

Embodiments of the present disclosure further provide a system for using a neural network in video processing, the system comprises a memory storing a set of instructions; and a processor configured to execute the set of instructions to cause the system to perform: receiving a video stream comprising a plurality of pictures; processing the plurality of pictures using a first branch of a first block in the neural network, wherein the neural network is configured to reduce blocking artifacts in video compression of the video stream and the first branch comprises one or more residual blocks; and processing the plurality of pictures using a second branch of the first block in the neural network, wherein the second branch comprises a down-sampling processing, an up-sampling processing, and one or more residual blocks.

Embodiments of the present disclosure further provide a non-transitory computer readable medium that stores a set of instructions that is executable by one or more processors of an apparatus to cause the apparatus to initiate a method for training a neural network in video processing, the method comprises receiving a plurality of training pictures; training a first branch of a first block in the neural network using the plurality of training pictures, wherein the neural network is configured to reduce blocking artifacts in video compression and the first branch comprises one or more residual blocks; and training a second branch of the first block in the neural network using the plurality of training pictures, wherein the second branch comprises a down-sampling processing, an up-sampling processing, and one or more residual blocks.

Embodiments of the present disclosure further provide a non-transitory computer readable medium that stores a set of instructions that is executable by one or more processors of an apparatus to cause the apparatus to initiate a method for using a neural network in video processing, the method comprises receiving a video stream comprising a plurality of pictures; processing the plurality of pictures using a first branch of a first block in the neural network, wherein the neural network is configured to reduce blocking artifacts in video compression of the video stream and the first branch comprises one or more residual blocks; and processing the plurality of pictures using a second branch of the first block in the neural network, wherein the second branch comprises a down-sampling processing, an up-sampling processing, and one or more residual blocks.

BRIEF DESCRIPTION OF THE DRAWINGS

Embodiments and various aspects of the present disclosure are illustrated in the following detailed description and the accompanying figures. Various features shown in the figures are not drawn to scale.

DETAILED DESCRIPTION

Figure 1:
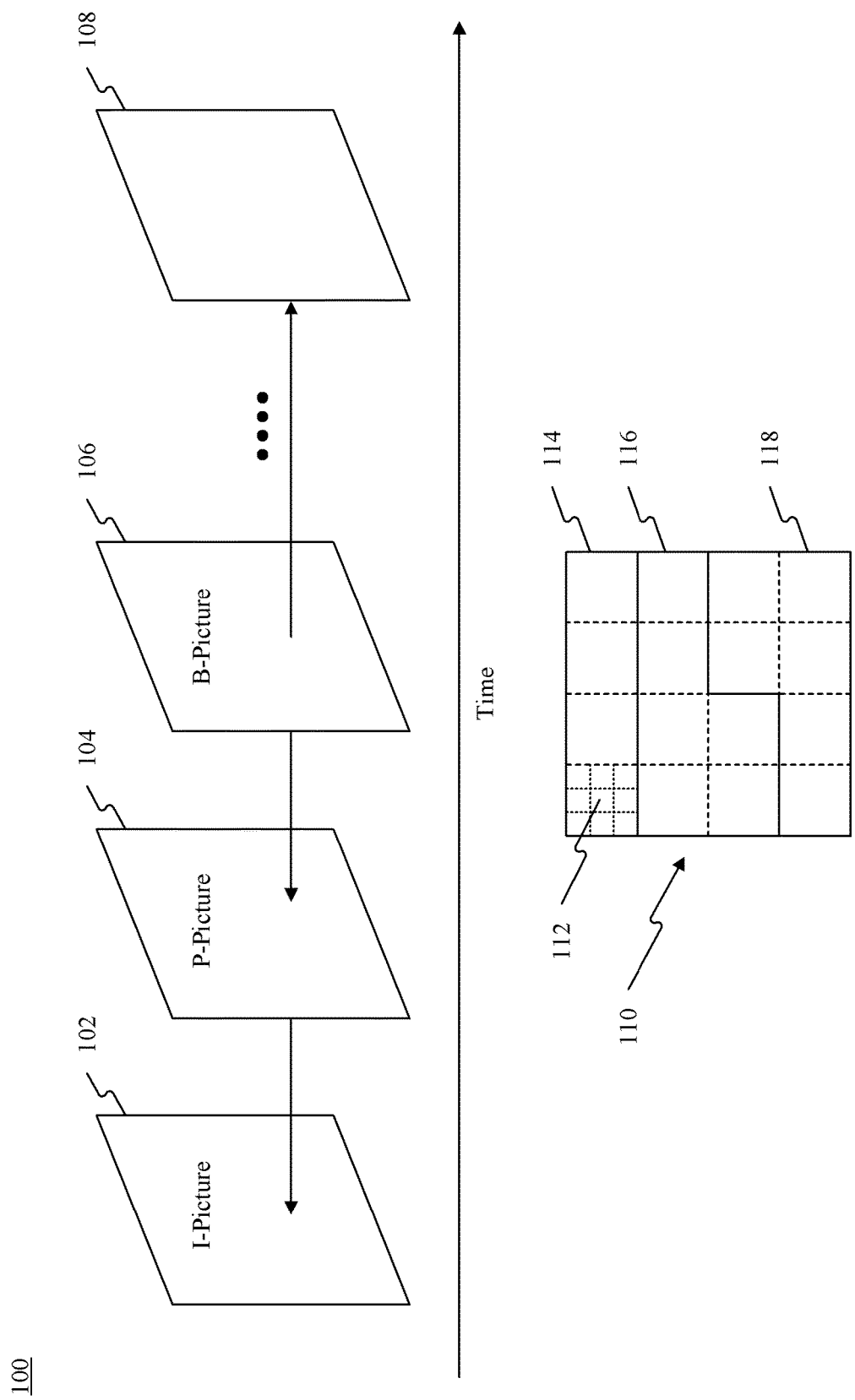
FIG. 1 shows structures of an example video sequence, according to some embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims. Particular aspects of the present disclosure are described in greater detail below. The terms and definitions provided herein control, if in conflict with terms and/or definitions incorporated by reference.

The Joint Video Experts Team (WET) of the ITU-T Video Coding Expert Group (ITU-T VCEG) and the ISO/IEC Moving Picture Expert Group (ISO/IEC MPEG) is currently developing the Versatile Video Coding (VVC/H.266) standard. The VVC standard is aimed at doubling the compression efficiency of its predecessor, the High Efficiency Video Coding (HEVC/H.265) standard. In other words, VVC's goal is to achieve the same subjective quality as HEVC/H.265 using half the bandwidth.

In order to achieve the same subjective quality as HEVC/H.265 using half the bandwidth, the Joint Video Experts Team ("WET") has been developing technologies beyond HEVC using the joint exploration model ("JEM") reference software. As coding technologies were incorporated into the JEM, the JEM achieved substantially higher coding performance than HEVC. The VCEG and MPEG have also formally started the development of a next generation video compression standard beyond HEVC.

The VVC standard has been developed recently and continues to include more coding technologies that provide better compression performance. VVC is based on the same hybrid video coding system that has been used in modern video compression standards such as HEVC, H.264/AVC, MPEG2, H.263, etc.

A video is a set of static pictures (or frames) arranged in a temporal sequence to store visual information. A video capture device (e.g., a camera) can be used to capture and store those pictures in a temporal sequence, and a video playback device (e.g., a television, a computer, a smartphone, a tablet computer, a video player, or any end-user terminal with a function of display) can be used to display such pictures in the temporal sequence. Also, in some applications, a video capturing device can transmit the captured video to the video playback device (e.g., a computer with a monitor) in real-time, such as for surveillance, conferencing, or live broadcasting.

To reduce the storage space and the transmission bandwidth needed by such applications, the video can be compressed. For example, the video can be compressed before storage and transmission and decompressed before the display. The compression and decompression can be implemented by software executed by a processor (e.g., a processor of a generic computer) or specialized hardware. The module or circuitry for compression is generally referred to as an "encoder," and the module or circuitry for decompression is generally referred to as a "decoder." The encoder and the decoder can be collectively referred to as a "codec." The encoder and the decoder can be implemented as any of a variety of suitable hardware, software, or a combination thereof. For example, the hardware implementation of the encoder and the decoder can include circuitry, such as one or more microprocessors, digital signal processors ("DSPs"), application-specific integrated circuits ("ASICs"), field-programmable gate arrays ("FPGAs"), discrete logic, or any combinations thereof. The software implementation of the encoder and the decoder can include program codes, computer-executable instructions, firmware, or any suitable computer-implemented algorithm or process fixed in a computer-readable medium. Video compression and decompression can be implemented by various algorithms or standards, such as MPEG-1, MPEG-2, MPEG-4, H.26x series, or the like. In some applications, the codec can decompress the video from a first coding standard and re-compress the decompressed video using a second coding standard, in which case the codec can be referred to as a "transcoder."

The video encoding process can identify and keep useful information that can be used to reconstruct a picture. If information that was disregarded in the video encoding process cannot be fully reconstructed, the encoding process can be referred to as "lossy." Otherwise, it can be referred to as "lossless." Most encoding processes are lossy, which is a tradeoff to reduce the needed storage space and the transmission bandwidth.

In many cases, the useful information of a picture being encoded (referred to as a "current picture") can include changes with respect to a reference picture (e.g., a picture previously encoded or reconstructed). Such changes can include position changes, luminosity changes, or color changes of the pixels. Position changes of a group of pixels that represent an object can reflect the motion of the object between the reference picture and the current picture.

A picture coded without referencing another picture (i.e., it is its own reference picture) is referred to as an "I-picture." A picture coded using a previous picture as a reference picture is referred to as a "P-picture." A picture coded using both a previous picture and a future picture as reference pictures (i.e., the reference is "bi-directional") is referred to as a "B-picture."

FIG. 1 shows structures of an example video sequence, according to some embodiments of the present disclosure. As shown in FIG. 1, video sequence 100 can be a live video or a video having been captured and archived. Video 100 can be a real-life video, a computer-generated video (e.g., computer game video), or a combination thereof (e.g., a real-life video with augmented-reality effects). Video sequence 100 can be inputted from a video capture device (e.g., a camera), a video archive (e.g., a video file stored in a storage device) containing previously captured video, or a video feed interface (e.g., a video broadcast transceiver) to receive video from a video content provider.

As shown in FIG. 1, video sequence 100 can include a series of pictures arranged temporally along a timeline, including pictures 102, 104, 106, and 108. Pictures 102-106 are continuous, and there are more pictures between pictures 106 and 108. In FIG. 1, picture 102 is an I-picture, the reference picture of which is picture 102 itself. Picture 104 is a P-picture, the reference picture of which is picture 102, as indicated by the arrow. Picture 106 is a B-picture, the reference pictures of which are pictures 104 and 108, as indicated by the arrows. In some embodiments, the reference picture of a picture (e.g., picture 104) can be not immediately preceding or following the picture. For example, the reference picture of picture 104 can be a picture preceding picture 102. It should be noted that the reference pictures of pictures 102-106 are only examples, and the present disclosure does not limit embodiments of the reference pictures as the examples shown in FIG. 1.

Typically, video codecs do not encode or decode an entire picture at one time due to the computing complexity of such tasks. Rather, they can split the picture into basic segments, and encode or decode the picture segment by segment. Such basic segments are referred to as basic processing units ("BPUs") in the present disclosure. For example, structure 110 in FIG. 1 shows an example structure of a picture of video sequence 100 (e.g., any of pictures 102-108). In structure 110, a picture is divided into 4×4 basic processing units, the boundaries of which are shown as dash lines. In some embodiments, the basic processing units can be referred to as "macroblocks" in some video coding standards (e.g., MPEG family, H.261, H.263, or H.264/AVC), or as "coding tree units" ("CTUs") in some other video coding standards (e.g., H.265/HEVC or H.266/VVC). The basic processing units can have variable sizes in a picture, such as 128×128, 64×64, 32×32, 16×16, 4×8, 16×32, or any arbitrary shape and size of pixels. The sizes and shapes of the basic processing units can be selected for a picture based on the balance of coding efficiency and levels of details to be kept in the basic processing unit.

The basic processing units can be logical units, which can include a group of different types of video data stored in a computer memory (e.g., in a video frame buffer). For example, a basic processing unit of a color picture can include a luma component (Y) representing achromatic brightness information, one or more chroma components (e.g., Cb and Cr) representing color information, and associated syntax elements, in which the luma and chroma components can have the same size of the basic processing unit. The luma and chroma components can be referred to as "coding tree blocks" ("CTBs") in some video coding standards (e.g., H.265/HEVC or H.266/VVC). Any operation performed to a basic processing unit can be repeatedly performed to each of its luma and chroma components.

Video coding has multiple stages of operations, examples of which are shown in FIGS. 2A-2B and FIGS. 3A-3B. For each stage, the size of the basic processing units can still be too large for processing, and thus can be further divided into segments referred to as "basic processing sub-units" in the present disclosure. In some embodiments, the basic processing sub-units can be referred to as "blocks" in some video coding standards (e.g., MPEG family, H.261, H.263, or H.264/AVC), or as "coding units" ("CUs") in some other video coding standards (e.g., H.265/HEVC or H.266/VVC). A basic processing sub-unit can have the same or smaller size than the basic processing unit. Similar to the basic processing units, basic processing sub-units are also logical units, which can include a group of different types of video data (e.g., Y, Cb, Cr, and associated syntax elements) stored in a computer memory (e.g., in a video frame buffer). Any operation performed to a basic processing sub-unit can be repeatedly performed to each of its luma and chroma components. It should be noted that such division can be performed to further levels depending on processing needs. It should also be noted that different stages can divide the basic processing units using different schemes.

Figure 2A:
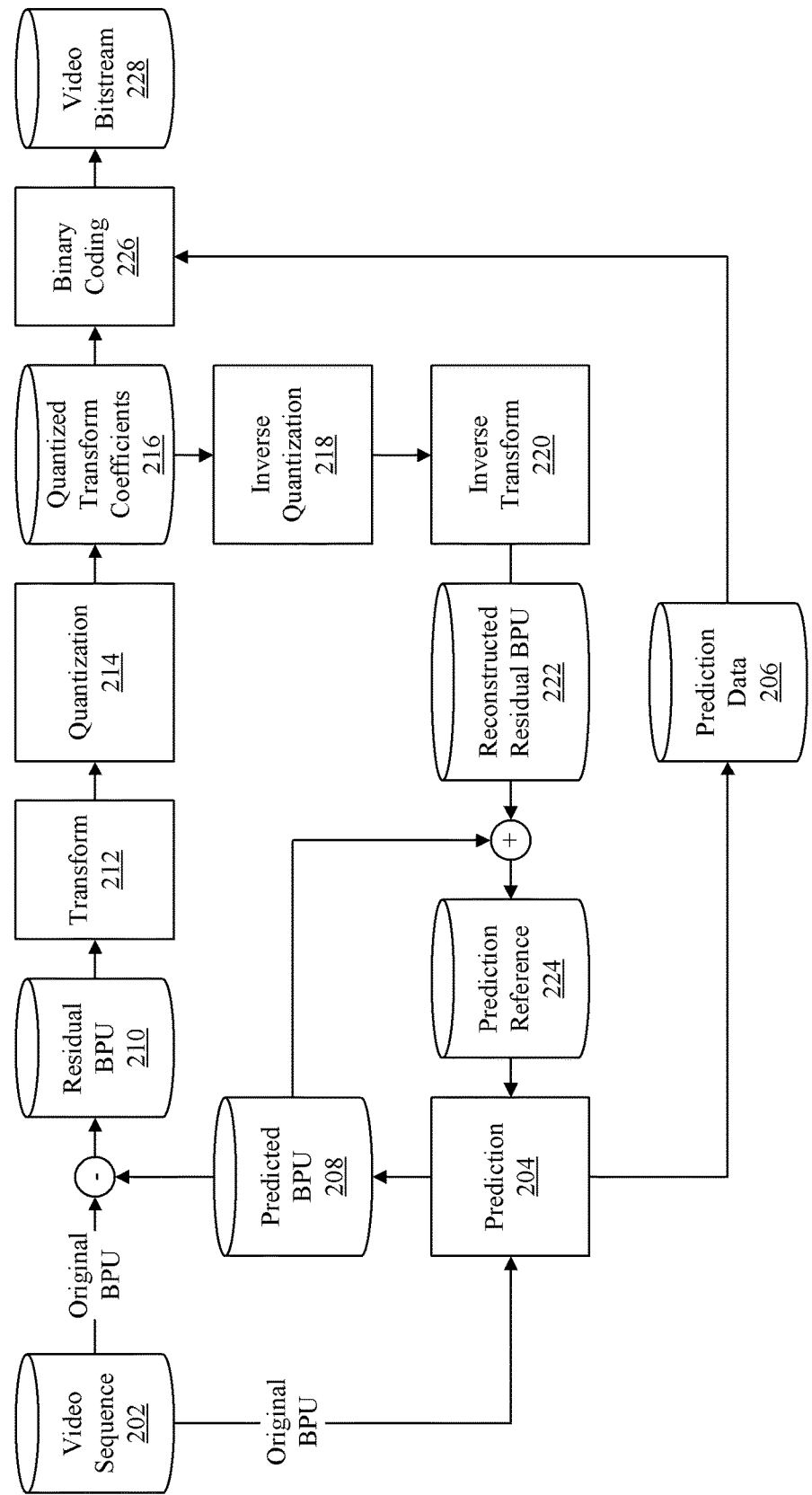
FIG. 2A shows a schematic of an example encoding process, according to some embodiments of the present disclosure.
Figure 2B:
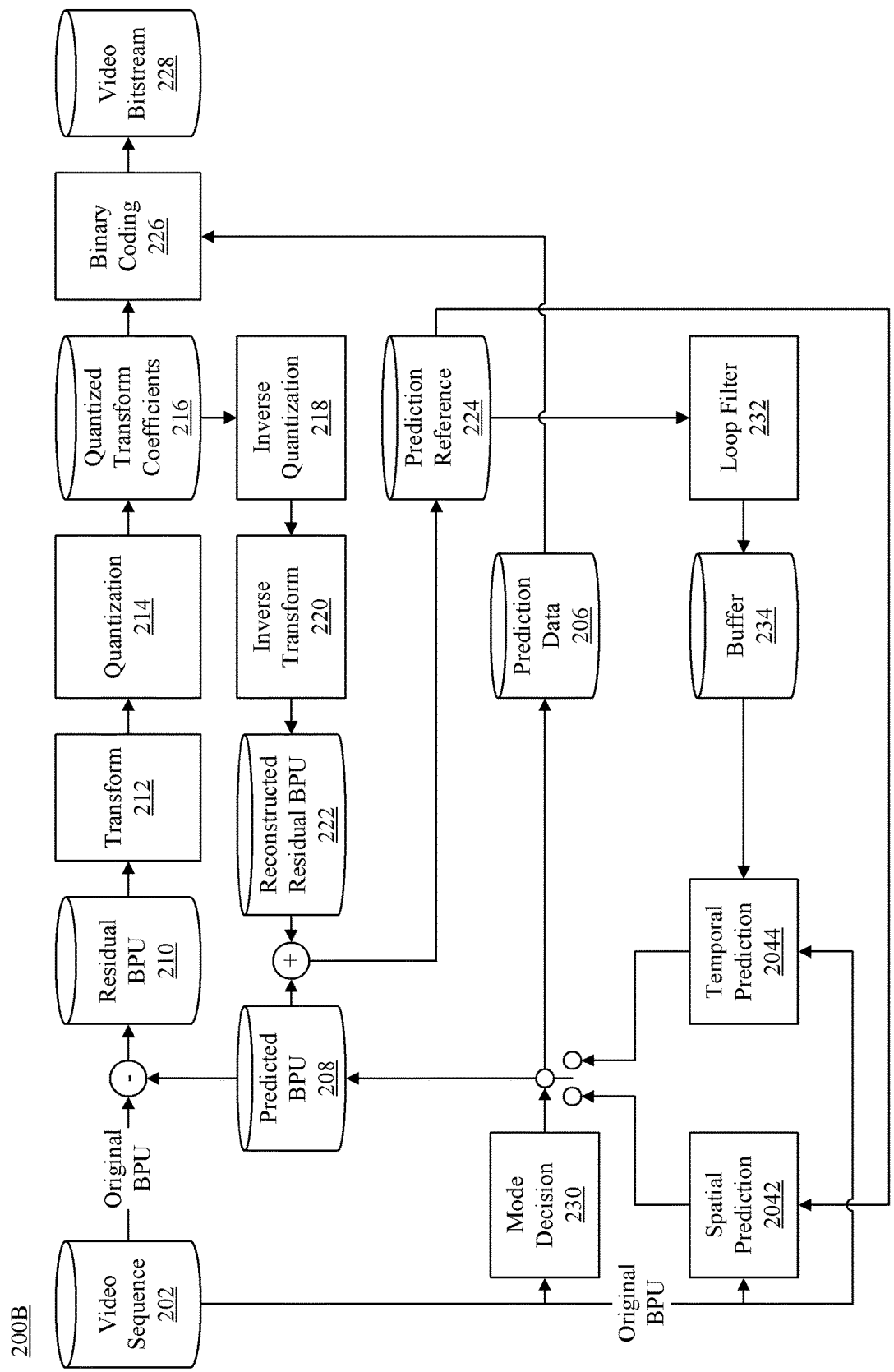
FIG. 2B shows a schematic of another example encoding process, according to some embodiments of the present disclosure.

For example, at a mode decision stage (an example of which is shown in FIG. 2B), the encoder can decide what prediction mode (e.g., intra-picture prediction or inter-picture prediction) to use for a basic processing unit, which can be too large to make such a decision. The encoder can split the basic processing unit into multiple basic processing sub-units (e.g., CUs as in H.265/HEVC or H.266/VVC), and decide a prediction type for each individual basic processing sub-unit.

For another example, at a prediction stage (an example of which is shown in FIGS. 2A-2B), the encoder can perform prediction operation at the level of basic processing sub-units (e.g., CUs). However, in some cases, a basic processing sub-unit can still be too large to process. The encoder can further split the basic processing sub-unit into smaller segments (e.g., referred to as "prediction blocks" or "PBs" in H.265/HEVC or H.266/VVC), at the level of which the prediction operation can be performed.

For another example, at a transform stage (an example of which is shown in FIGS. 2A-2B), the encoder can perform a transform operation for residual basic processing sub-units (e.g., CUs). However, in some cases, a basic processing sub-unit can still be too large to process. The encoder can further split the basic processing sub-unit into smaller segments (e.g., referred to as "transform blocks" or "TBs" in H.265/HEVC or H.266/VVC), at the level of which the transform operation can be performed. It should be noted that the division schemes of the same basic processing sub-unit can be different at the prediction stage and the transform stage. For example, in H.265/HEVC or H.266/VVC, the prediction blocks and transform blocks of the same CU can have different sizes and numbers.

In structure 110 of FIG. 1, basic processing unit 112 is further divided into 3×3 basic processing sub-units, the boundaries of which are shown as dotted lines. Different basic processing units of the same picture can be divided into basic processing sub-units in different schemes.

In some implementations, to provide the capability of parallel processing and error resilience to video encoding and decoding, a picture can be divided into regions for processing, such that, for a region of the picture, the encoding or decoding process can depend on no information from any other region of the picture. In other words, each region of the picture can be processed independently. By doing so, the codec can process different regions of a picture in parallel, thus increasing the coding efficiency. Also, when data of a region is corrupted in the processing or lost in network transmission, the codec can correctly encode or decode other regions of the same picture without reliance on the corrupted or lost data, thus providing the capability of error resilience. In some video coding standards, a picture can be divided into different types of regions. For example, H.265/HEVC and H.266/VVC provide two types of regions: "slices" and "tiles." It should also be noted that different pictures of video sequence 100 can have different partition schemes for dividing a picture into regions.

For example, in FIG. 1, structure 110 is divided into three regions 114, 116, and 118, the boundaries of which are shown as solid lines inside structure 110. Region 114 includes four basic processing units. Each of regions 116 and 118 includes six basic processing units. It should be noted that the basic processing units, basic processing sub-units, and regions of structure 110 in FIG. 1 are only examples, and the present disclosure does not limit embodiments thereof.

FIG. 2A shows a schematic of an example encoding process, according to some embodiments of the present disclosure. For example, encoding process 200A shown in FIG. 2A can be performed by an encoder. As shown in FIG. 2A, the encoder can encode video sequence 202 into video bitstream 228 according to process 200A. Similar to video sequence 100 in FIG. 1, video sequence 202 can include a set of pictures (referred to as "original pictures") arranged in a temporal order. Similar to structure 110 in FIG. 1, each original picture of video sequence 202 can be divided by the encoder into basic processing units, basic processing sub-units, or regions for processing. In some embodiments, the encoder can perform process 200A at the level of basic processing units for each original picture of video sequence 202. For example, the encoder can perform process 200A in an iterative manner, in which the encoder can encode a basic processing unit in one iteration of process 200A. In some embodiments, the encoder can perform process 200A in parallel for regions (e.g., regions 114-118) of each original picture of video sequence 202.

In FIG. 2A, the encoder can feed a basic processing unit (referred to as an "original BPU") of an original picture of video sequence 202 to prediction stage 204 to generate prediction data 206 and predicted BPU 208. The encoder can subtract predicted BPU 208 from the original BPU to generate residual BPU 210. The encoder can feed residual BPU 210 to transform stage 212 and quantization stage 214 to generate quantized transform coefficients 216. The encoder can feed prediction data 206 and quantized transform coefficients 216 to binary coding stage 226 to generate video bitstream 228. Components 202, 204, 206, 208, 210, 212, 214, 216, 226, and 228 can be referred to as a "forward path." During process 200A, after quantization stage 214, the encoder can feed quantized transform coefficients 216 to inverse quantization stage 218 and inverse transform stage 220 to generate reconstructed residual BPU 222. The encoder can add reconstructed residual BPU 222 to predicted BPU 208 to generate prediction reference 224, which is used in prediction stage 204 for the next iteration of process 200A. Components 218, 220, 222, and 224 of process 200A can be referred to as a "reconstruction path." The reconstruction path can be used to ensure that both the encoder and the decoder use the same reference data for prediction.

The encoder can perform process 200A iteratively to encode each original BPU of the original picture (in the forward path) and generate predicted reference 224 for encoding the next original BPU of the original picture (in the reconstruction path). After encoding all original BPUs of the original picture, the encoder can proceed to encode the next picture in video sequence 202.

Referring to process 200A, the encoder can receive video sequence 202 generated by a video capturing device (e.g., a camera). The term "receive" used herein can refer to receiving, inputting, acquiring, retrieving, obtaining, reading, accessing, or any action in any manner for inputting data.

At prediction stage 204, at a current iteration, the encoder can receive an original BPU and prediction reference 224, and perform a prediction operation to generate prediction data 206 and predicted BPU 208. Prediction reference 224 can be generated from the reconstruction path of the previous iteration of process 200A. The purpose of prediction stage 204 is to reduce information redundancy by extracting prediction data 206 that can be used to reconstruct the original BPU as predicted BPU 208 from prediction data 206 and prediction reference 224.

Ideally, predicted BPU 208 can be identical to the original BPU. However, due to non-ideal prediction and reconstruction operations, predicted BPU 208 is generally slightly different from the original BPU. For recording such differences, after generating predicted BPU 208, the encoder can subtract it from the original BPU to generate residual BPU 210. For example, the encoder can subtract values (e.g., greyscale values or RGB values) of pixels of predicted BPU 208 from values of corresponding pixels of the original BPU. Each pixel of residual BPU 210 can have a residual value as a result of such subtraction between the corresponding pixels of the original BPU and predicted BPU 208. Compared with the original BPU, prediction data 206 and residual BPU 210 can have fewer bits, but they can be used to reconstruct the original BPU without significant quality deterioration. Thus, the original BPU is compressed.

To further compress residual BPU 210, at transform stage 212, the encoder can reduce spatial redundancy of residual BPU 210 by decomposing it into a set of two-dimensional "base patterns," each base pattern being associated with a "transform coefficient." The base patterns can have the same size (e.g., the size of residual BPU 210). Each base pattern can represent a variation frequency (e.g., frequency of brightness variation) component of residual BPU 210. None of the base patterns can be reproduced from any combinations (e.g., linear combinations) of any other base patterns. In other words, the decomposition can decompose variations of residual BPU 210 into a frequency domain. Such a decomposition is analogous to a discrete Fourier transform of a function, in which the base patterns are analogous to the base functions (e.g., trigonometry functions) of the discrete Fourier transform, and the transform coefficients are analogous to the coefficients associated with the base functions.

Different transform algorithms can use different base patterns. Various transform algorithms can be used at transform stage 212, such as, for example, a discrete cosine transform, a discrete sine transform, or the like. The transform at transform stage 212 is invertible. That is, the encoder can restore residual BPU 210 by an inverse operation of the transform (referred to as an "inverse transform"). For example, to restore a pixel of residual BPU 210, the inverse transform can be multiplying values of corresponding pixels of the base patterns by respective associated coefficients and adding the products to produce a weighted sum. For a video coding standard, both the encoder and decoder can use the same transform algorithm (thus the same base patterns). Thus, the encoder can record only the transform coefficients, from which the decoder can reconstruct residual BPU 210 without receiving the base patterns from the encoder. Compared with residual BPU 210, the transform coefficients can have fewer bits, but they can be used to reconstruct residual BPU 210 without significant quality deterioration. Thus, residual BPU 210 is further compressed.

The encoder can further compress the transform coefficients at quantization stage 214. In the transform process, different base patterns can represent different variation frequencies (e.g., brightness variation frequencies). Because human eyes are generally better at recognizing low-frequency variation, the encoder can disregard information of high-frequency variation without causing significant quality deterioration in decoding. For example, at quantization stage 214, the encoder can generate quantized transform coefficients 216 by dividing each transform coefficient by an integer value (referred to as a "quantization parameter") and rounding the quotient to its nearest integer. After such an operation, some transform coefficients of the high-frequency base patterns can be converted to zero, and the transform coefficients of the low-frequency base patterns can be converted to smaller integers. The encoder can disregard the zero-value quantized transform coefficients 216, by which the transform coefficients are further compressed. The quantization process is also invertible, in which quantized transform coefficients 216 can be reconstructed to the transform coefficients in an inverse operation of the quantization (referred to as "inverse quantization").

Because the encoder disregards the remainders of such divisions in the rounding operation, quantization stage 214 can be lossy. Typically, quantization stage 214 can contribute the most information loss in process 200A. The larger the information loss is, the fewer bits the quantized transform coefficients 216 can need. For obtaining different levels of information loss, the encoder can use different values of the quantization parameter or any other parameter of the quantization process.

At binary coding stage 226, the encoder can encode prediction data 206 and quantized transform coefficients 216 using a binary coding technique, such as, for example, entropy coding, variable length coding, arithmetic coding, Huffman coding, context-adaptive binary arithmetic coding, or any other lossless or lossy compression algorithm. In some embodiments, besides prediction data 206 and quantized transform coefficients 216, the encoder can encode other information at binary coding stage 226, such as, for example, a prediction mode used at prediction stage 204, parameters of the prediction operation, a transform type at transform stage 212, parameters of the quantization process (e.g., quantization parameters), an encoder control parameter (e.g., a bitrate control parameter), or the like. The encoder can use the output data of binary coding stage 226 to generate video bitstream 228. In some embodiments, video bitstream 228 can be further packetized for network transmission.

Referring to the reconstruction path of process 200A, at inverse quantization stage 218, the encoder can perform inverse quantization on quantized transform coefficients 216 to generate reconstructed transform coefficients. At inverse transform stage 220, the encoder can generate reconstructed residual BPU 222 based on the reconstructed transform coefficients. The encoder can add reconstructed residual BPU 222 to predicted BPU 208 to generate prediction reference 224 that is to be used in the next iteration of process 200A.

It should be noted that other variations of the process 200A can be used to encode video sequence 202. In some embodiments, stages of process 200A can be performed by the encoder in different orders. In some embodiments, one or more stages of process 200A can be combined into a single stage. In some embodiments, a single stage of process 200A can be divided into multiple stages. For example, transform stage 212 and quantization stage 214 can be combined into a single stage. In some embodiments, process 200A can include additional stages. In some embodiments, process 200A can omit one or more stages in FIG. 2A.

FIG. 2B shows a schematic of another example encoding process, according to some embodiments of the present disclosure. As shown in FIG. 2B, process 200B can be modified from process 200A. For example, process 200B can be used by an encoder conforming to a hybrid video coding standard (e.g., H.26x series). Compared with process 200A, the forward path of process 200B additionally includes mode decision stage 230 and divides prediction stage 204 into spatial prediction stage 2042 and temporal prediction stage 2044. The reconstruction path of process 200B additionally includes loop filter stage 232 and buffer 234.

Generally, prediction techniques can be categorized into two types: spatial prediction and temporal prediction. Spatial prediction (e.g., an intra-picture prediction or "intra prediction") can use pixels from one or more already coded neighboring BPUs in the same picture to predict the current BPU. That is, prediction reference 224 in the spatial prediction can include the neighboring BPUs. The spatial prediction can reduce the inherent spatial redundancy of the picture. Temporal prediction (e.g., an inter-picture prediction or "inter prediction") can use regions from one or more already coded pictures to predict the current BPU. That is, prediction reference 224 in the temporal prediction can include the coded pictures. The temporal prediction can reduce the inherent temporal redundancy of the pictures.

Referring to process 200B, in the forward path, the encoder performs the prediction operation at spatial prediction stage 2042 and temporal prediction stage 2044. For example, at spatial prediction stage 2042, the encoder can perform the intra prediction. For an original BPU of a picture being encoded, prediction reference 224 can include one or more neighboring BPUs that have been encoded (in the forward path) and reconstructed (in the reconstructed path) in the same picture. The encoder can generate predicted BPU 208 by extrapolating the neighboring BPUs. The extrapolation technique can include, for example, a linear extrapolation or interpolation, a polynomial extrapolation or interpolation, or the like. In some embodiments, the encoder can perform the extrapolation at the pixel level, such as by extrapolating values of corresponding pixels for each pixel of predicted BPU 208. The neighboring BPUs used for extrapolation can be located with respect to the original BPU from various directions, such as in a vertical direction (e.g., on top of the original BPU), a horizontal direction (e.g., to the left of the original BPU), a diagonal direction (e.g., to the down-left, down-right, up-left, or up-right of the original BPU), or any direction defined in the used video coding standard. For the intra prediction, prediction data 206 can include, for example, locations (e.g., coordinates) of the used neighboring BPUs, sizes of the used neighboring BPUs, parameters of the extrapolation, a direction of the used neighboring BPUs with respect to the original BPU, or the like.

For another example, at temporal prediction stage 2044, the encoder can perform the inter prediction. For an original BPU of a current picture, prediction reference 224 can include one or more pictures (referred to as "reference pictures") that have been encoded (in the forward path) and reconstructed (in the reconstructed path). In some embodiments, a reference picture can be encoded and reconstructed BPU by BPU. For example, the encoder can add reconstructed residual BPU 222 to predicted BPU 208 to generate a reconstructed BPU. When all reconstructed BPUs of the same picture are generated, the encoder can generate a reconstructed picture as a reference picture. The encoder can perform an operation of "motion estimation" to search for a matching region in a scope (referred to as a "search window") of the reference picture. The location of the search window in the reference picture can be determined based on the location of the original BPU in the current picture. For example, the search window can be centered at a location having the same coordinates in the reference picture as the original BPU in the current picture and can be extended out for a predetermined distance. When the encoder identifies (e.g., by using a pel-recursive algorithm, a block-matching algorithm, or the like) a region similar to the original BPU in the search window, the encoder can determine such a region as the matching region. The matching region can have different dimensions (e.g., being smaller than, equal to, larger than, or in a different shape) from the original BPU. Because the reference picture and the current picture are temporally separated in the timeline (e.g., as shown in FIG. 1), it can be deemed that the matching region "moves" to the location of the original BPU as time goes by. The encoder can record the direction and distance of such a motion as a "motion vector." When multiple reference pictures are used (e.g., as picture 106 in FIG. 1), the encoder can search for a matching region and determine its associated motion vector for each reference picture. In some embodiments, the encoder can assign weights to pixel values of the matching regions of respective matching reference pictures.

The motion estimation can be used to identify various types of motions, such as, for example, translations, rotations, zooming, or the like. For inter prediction, prediction data 206 can include, for example, locations (e.g., coordinates) of the matching region, the motion vectors associated with the matching region, the number of reference pictures, weights associated with the reference pictures, or the like.

For generating predicted BPU 208, the encoder can perform an operation of "motion compensation." The motion compensation can be used to reconstruct predicted BPU 208 based on prediction data 206 (e.g., the motion vector) and prediction reference 224. For example, the encoder can move the matching region of the reference picture according to the motion vector, in which the encoder can predict the original BPU of the current picture. When multiple reference pictures are used (e.g., as picture 106 in FIG. 1), the encoder can move the matching regions of the reference pictures according to the respective motion vectors and average pixel values of the matching regions. In some embodiments, if the encoder has assigned weights to pixel values of the matching regions of respective matching reference pictures, the encoder can add a weighted sum of the pixel values of the moved matching regions.

In some embodiments, the inter prediction can be unidirectional or bidirectional. Unidirectional inter predictions can use one or more reference pictures in the same temporal direction with respect to the current picture. For example, picture 104 in FIG. 1 is a unidirectional inter-predicted picture, in which the reference picture (i.e., picture 102) precedes picture 104. Bidirectional inter predictions can use one or more reference pictures at both temporal directions with respect to the current picture. For example, picture 106 in FIG. 1 is a bidirectional inter-predicted picture, in which the reference pictures (i.e., pictures 104 and 108) are at both temporal directions with respect to picture 104.

Still referring to the forward path of process 200B, after spatial prediction stage 2042 and temporal prediction stage 2044, at mode decision stage 230, the encoder can select a prediction mode (e.g., one of the intra prediction or the inter prediction) for the current iteration of process 200B. For example, the encoder can perform a rate-distortion optimization technique, in which the encoder can select a prediction mode to minimize a value of a cost function depending on a bit rate of a candidate prediction mode and distortion of the reconstructed reference picture under the candidate prediction mode. Depending on the selected prediction mode, the encoder can generate the corresponding predicted BPU 208 and predicted data 206.

In the reconstruction path of process 200B, if intra prediction mode has been selected in the forward path, after generating prediction reference 224 (e.g., the current BPU that has been encoded and reconstructed in the current picture), the encoder can directly feed prediction reference 224 to spatial prediction stage 2042 for later usage (e.g., for extrapolation of a next BPU of the current picture). If the inter prediction mode has been selected in the forward path, after generating prediction reference 224 (e.g., the current picture in which all BPUs have been encoded and reconstructed), the encoder can feed prediction reference 224 to loop filter stage 232, at which the encoder can apply a loop filter to prediction reference 224 to reduce or eliminate distortion (e.g., blocking artifacts) introduced by the inter prediction. The encoder can apply various loop filter techniques at loop filter stage 232, such as, for example, deblocking, sample adaptive offsets, adaptive loop filters, or the like. The loop-filtered reference picture can be stored in buffer 234 (or "decoded picture buffer") for later use (e.g., to be used as an inter-prediction reference picture for a future picture of video sequence 202). The encoder can store one or more reference pictures in buffer 234 to be used at temporal prediction stage 2044. In some embodiments, the encoder can encode parameters of the loop filter (e.g., a loop filter strength) at binary coding stage 226, along with quantized transform coefficients 216, prediction data 206, and other information.

Figure 3A:
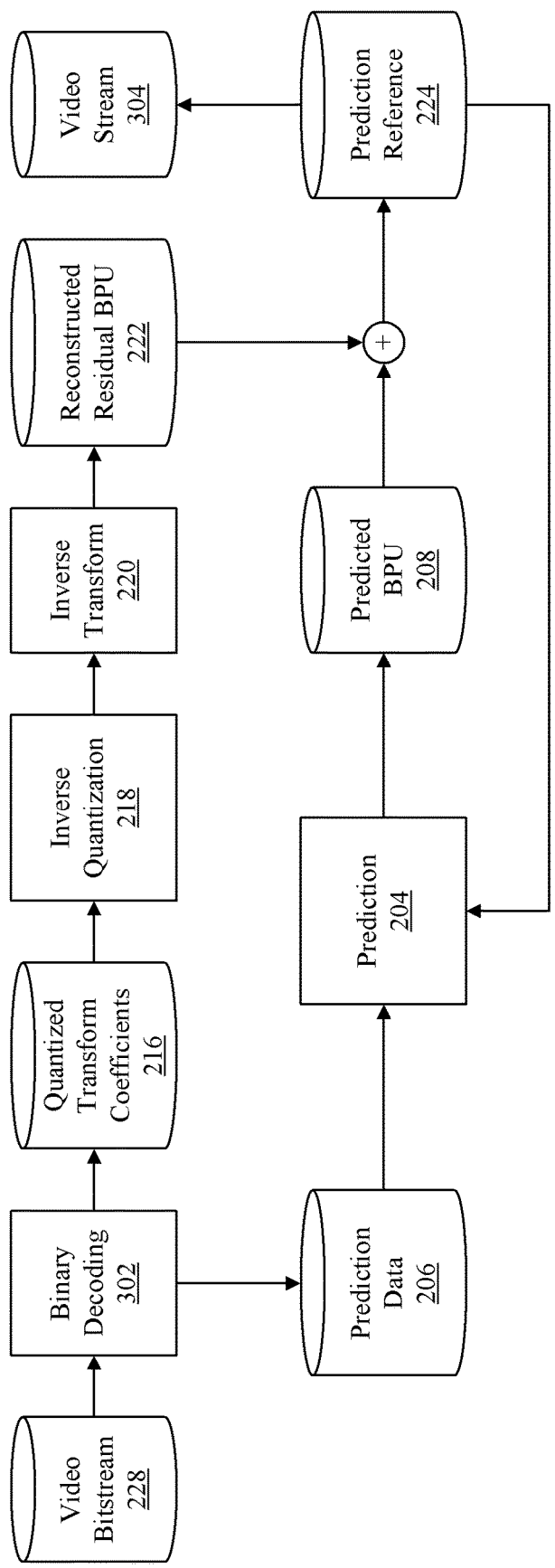
FIG. 3A shows a schematic of an example decoding process, according to some embodiments of the present disclosure.

FIG. 3A shows a schematic of an example decoding process, according to some embodiments of the present disclosure. As shown in FIG. 3A, process 300A can be a decompression process corresponding to the compression process 200A in FIG. 2A. In some embodiments, process 300A can be similar to the reconstruction path of process 200A. A decoder can decode video bitstream 228 into video stream 304 according to process 300A. Video stream 304 can be very similar to video sequence 202. However, due to the information loss in the compression and decompression process (e.g., quantization stage 214 in FIGS. 2A-2B), generally, video stream 304 is not identical to video sequence 202. Similar to processes 200A and 200B in FIGS. 2A-2B, the decoder can perform process 300A at the level of basic processing units (BPUs) for each picture encoded in video bitstream 228. For example, the decoder can perform process 300A in an iterative manner, in which the decoder can decode a basic processing unit in one iteration of process 300A. In some embodiments, the decoder can perform process 300A in parallel for regions (e.g., regions 114-118) of each picture encoded in video bitstream 228.

In FIG. 3A, the decoder can feed a portion of video bitstream 228 associated with a basic processing unit (referred to as an "encoded BPU") of an encoded picture to binary decoding stage 302. At binary decoding stage 302, the decoder can decode the portion into prediction data 206 and quantized transform coefficients 216. The decoder can feed quantized transform coefficients 216 to inverse quantization stage 218 and inverse transform stage 220 to generate reconstructed residual BPU 222. The decoder can feed prediction data 206 to prediction stage 204 to generate predicted BPU 208. The decoder can add reconstructed residual BPU 222 to predicted BPU 208 to generate predicted reference 224. In some embodiments, predicted reference 224 can be stored in a buffer (e.g., a decoded picture buffer in a computer memory). The decoder can feed predicted reference 224 to prediction stage 204 for performing a prediction operation in the next iteration of process 300A.

The decoder can perform process 300A iteratively to decode each encoded BPU of the encoded picture and generate predicted reference 224 for encoding the next encoded BPU of the encoded picture. After decoding all encoded BPUs of the encoded picture, the decoder can output the picture to video stream 304 for display and proceed to decode the next encoded picture in video bitstream 228.

At binary decoding stage 302, the decoder can perform an inverse operation of the binary coding technique used by the encoder (e.g., entropy coding, variable length coding, arithmetic coding, Huffman coding, context-adaptive binary arithmetic coding, or any other lossless compression algorithm). In some embodiments, besides prediction data 206 and quantized transform coefficients 216, the decoder can decode other information at binary decoding stage 302, such as, for example, a prediction mode, parameters of the prediction operation, a transform type, parameters of the quantization process (e.g., quantization parameters), an encoder control parameter (e.g., a bitrate control parameter), or the like. In some embodiments, if video bitstream 228 is transmitted over a network in packets, the decoder can depacketize video bitstream 228 before feeding it to binary decoding stage 302.

Figure 3B:
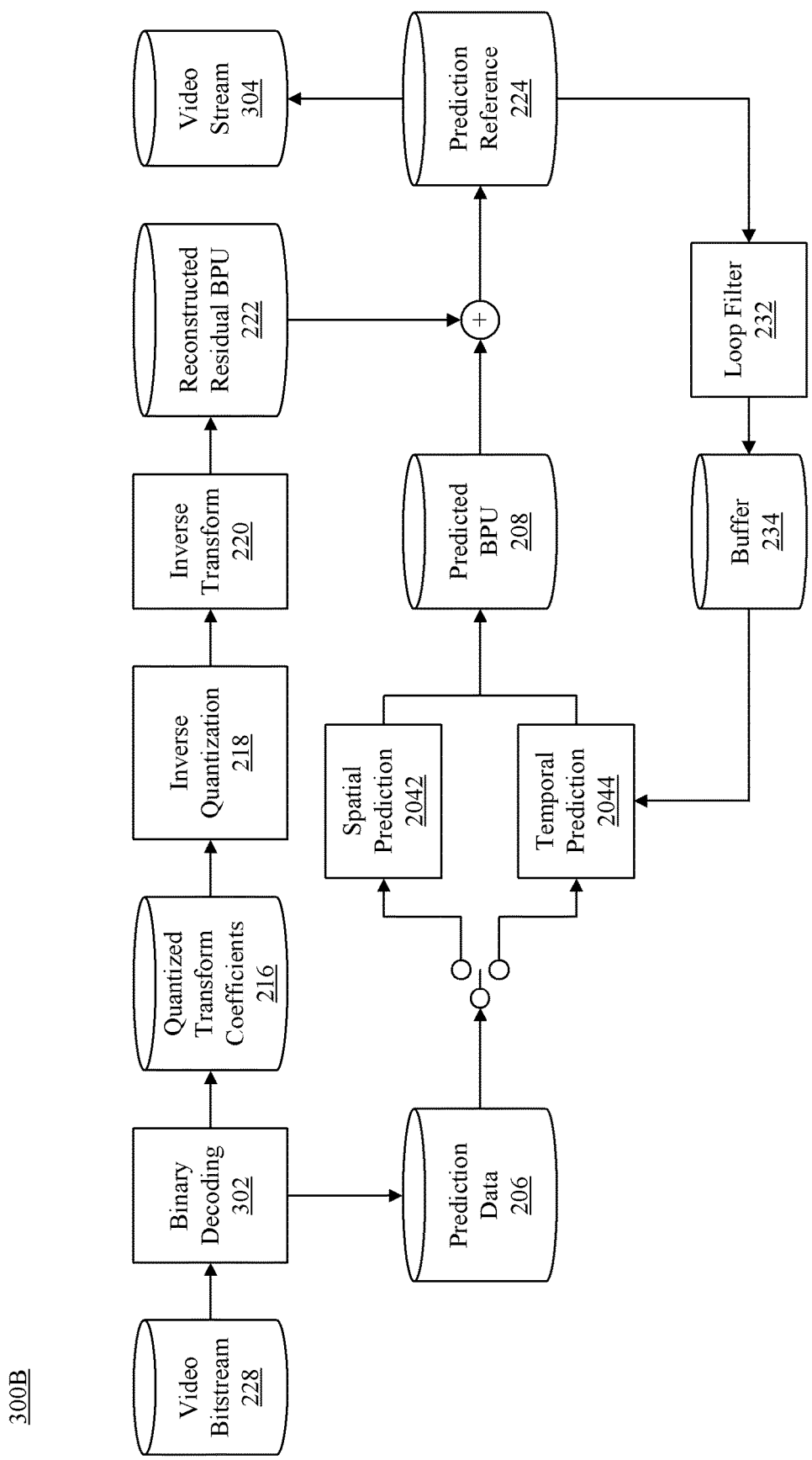
FIG. 3B shows a schematic of another example decoding process, according to some embodiments of the present disclosure.

FIG. 3B shows a schematic of another example decoding process, according to some embodiments of the present disclosure. As shown in FIG. 3B, process 300B can be modified from process 300A. For example, process 300B can be used by a decoder conforming to a hybrid video coding standard (e.g., H.26x series). Compared with process 300A, process 300B additionally divides prediction stage 204 into spatial prediction stage 2042 and temporal prediction stage 2044, and additionally includes loop filter stage 232 and buffer 234.

In process 300B, for an encoded basic processing unit (referred to as a "current BPU") of an encoded picture (referred to as a "current picture") that is being decoded, prediction data 206 decoded from binary decoding stage 302 by the decoder can include various types of data, depending on what prediction mode was used to encode the current BPU by the encoder. For example, if intra prediction was used by the encoder to encode the current BPU, prediction data 206 can include a prediction mode indicator (e.g., a flag value) indicative of the intra prediction, parameters of the intra prediction operation, or the like. The parameters of the intra prediction operation can include, for example, locations (e.g., coordinates) of one or more neighboring BPUs used as a reference, sizes of the neighboring BPUs, parameters of extrapolation, a direction of the neighboring BPUs with respect to the original BPU, or the like. For another example, if inter prediction was used by the encoder to encode the current BPU, prediction data 206 can include a prediction mode indicator (e.g., a flag value) indicative of the inter prediction, parameters of the inter prediction operation, or the like. The parameters of the inter prediction operation can include, for example, the number of reference pictures associated with the current BPU, weights respectively associated with the reference pictures, locations (e.g., coordinates) of one or more matching regions in the respective reference pictures, one or more motion vectors respectively associated with the matching regions, or the like.

Based on the prediction mode indicator, the decoder can decide whether to perform a spatial prediction (e.g., the intra prediction) at spatial prediction stage 2042 or a temporal prediction (e.g., the inter prediction) at temporal prediction stage 2044. The details of performing such spatial prediction or temporal prediction are described in FIG. 2B and will not be repeated hereinafter. After performing such spatial prediction or temporal prediction, the decoder can generate predicted BPU 208. The decoder can add predicted BPU 208 and reconstructed residual BPU 222 to generate prediction reference 224, as described in FIG. 3A.

In process 300B, the decoder can feed predicted reference 224 to spatial prediction stage 2042 or temporal prediction stage 2044 for performing a prediction operation in the next iteration of process 300B. For example, if the current BPU is decoded using the intra prediction at spatial prediction stage 2042, after generating prediction reference 224 (e.g., the decoded current BPU), the decoder can directly feed prediction reference 224 to spatial prediction stage 2042 for later usage (e.g., for extrapolation of a next BPU of the current picture). If the current BPU is decoded using the inter prediction at temporal prediction stage 2044, after generating prediction reference 224 (e.g., a reference picture in which all BPUs have been decoded), the encoder can feed prediction reference 224 to loop filter stage 232 to reduce or eliminate distortion (e.g., blocking artifacts). The decoder can apply a loop filter to prediction reference 224, in a way as described in FIG. 2B. The loop-filtered reference picture can be stored in buffer 234 (e.g., a decoded picture buffer in a computer memory) for later use (e.g., to be used as an inter-prediction reference picture for a future encoded picture of video bitstream 228). The decoder can store one or more reference pictures in buffer 234 to be used at temporal prediction stage 2044. In some embodiments, when the prediction mode indicator of prediction data 206 indicates that inter prediction was used to encode the current BPU, prediction data can further include parameters of the loop filter (e.g., a loop filter strength).

There can be four types of loop filters. For example, the loop filters can include a deblocking filter, a sample adaptive offsets ("SAO") filter, a luma mapping with chroma scaling ("LMCS") filter, and an adaptive loop filter ("ALF"). The order of applying the four types of loop filters can be the LMCS filter, the deblocking filter, the SAO filter, and the ALF. The LMCS filter can include two main components.

The first component can be an in-loop mapping of the luma component based on adaptive piecewise linear models. The second component can be for the chroma components, and luma-dependent chroma residual scaling can be applied.

Figure 4:
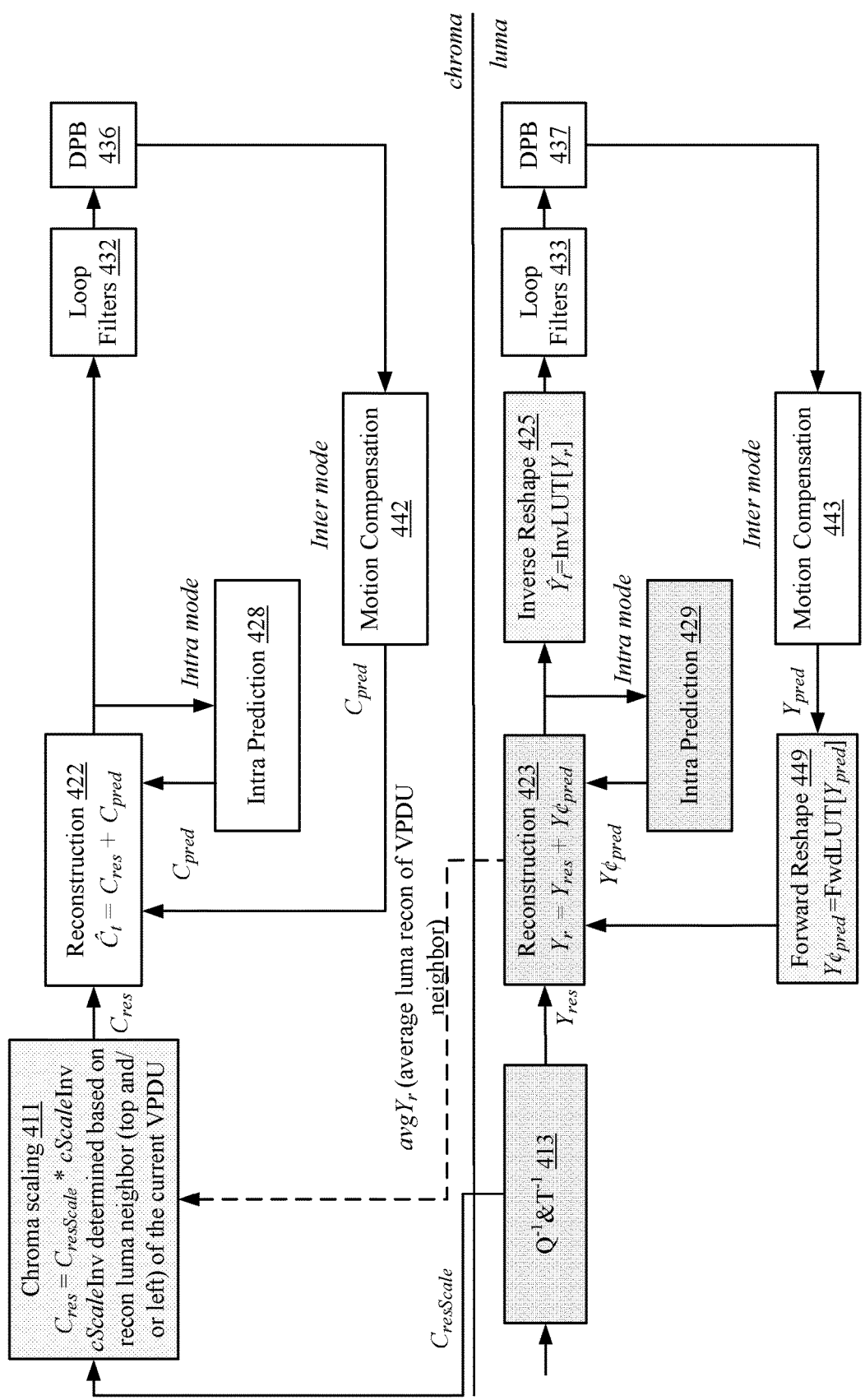
FIG. 4 shows a schematic of an example luma mapping with chroma scaling filter in a decoding process, according to some embodiments of the present disclosure.

FIG. 4 shows a schematic of an example luma mapping with chroma scaling filter in a decoding process, according to some embodiments of the present disclosure. As shown in FIG. 4, components shaded in dark grey indicate where the processing can be applied in the mapped domain. These components can include inverse quantization and inverse transform 413, luma intra prediction 429, and adding of the luma prediction together with luma residual in reconstruction 423. The unshaded components shown in FIG. 4 indicate where the processing is applied in the original (e.g., non-mapped) domain. These components can include loop filters 432 and 433 (e.g., deblocking filter, ALF filter, SAO filter, etc.), chroma motion compensated prediction 442, luma motion compensated prediction 443, chroma intra prediction 428, adding of the chroma prediction together with the chroma residual in reconstruction 422, and storage of decoded pictures as reference pictures in DBP 436 and DBP 437. The components sharded in light grey in FIG. 4 can be new LMCS functional blocks, such as forward mapping of the luma signal 449, inverse mapping of the luma signal 425, and a luma-dependent chroma scaling process 411.

In some systems (e.g., Test Model 7 of VVC ("VTM7")), LMCS can be enabled or disabled at a sequence level using a sequence parameter set ("SPS") flag. The deblocking filter can be applied to all samples adjacent to a picture unit ("PU") or a tile unit ("TU") boundary except when the boundary is also a picture boundary or when the deblocking is disabled across slice or tile boundaries. These systems can be modified. For example, in VVC, the following features can be added: a filter strength of the deblocking filter that is dependent on an averaged luma level of reconstructed samples; a deblocking parameter table extension and adaptation to 10-bit video; 4×4 grid deblocking for luma; stronger deblocking filter for luma; stronger deblocking filter for chroma; deblocking filter for subblock boundary; and deblocking decision adapted to smaller differences in motion.

The SAO filter can be a process in decoding that modifies decoded samples by conditionally adding an offset value to each sample after deblocking filter, based on values in look-up tables transmitted by the encoder. In some systems (e.g., VVC or VTM7), the SAO filter can include a band offset mode and an edge offset mode. In the band offset mode, a full sample amplitude range can be uniformly split into 32 segments called bands, and the sample values belonging to four of these bands (which are consecutive within the 32 bands) are modified by adding transmitted values denoted as band offsets. The band offsets can be positive or negative. One of the reasons for using four consecutive bands is that in the smooth areas where banding artifacts can appear, the sample amplitudes in a CTB tend to be concentrated in only few of the bands. In the edge offset mode, a syntax element sao_eo_class with values from 0 to 3 can signal whether a horizontal, vertical or one of two diagonal gradient directions is used for the edge offset classification in the CTB. Each sample in the CTB can be classified into one of five categories by comparing the sample value with the two neighboring samples. For each category, an offset can be signaled to the decoder and added to the corresponding samples.

Figure 5:
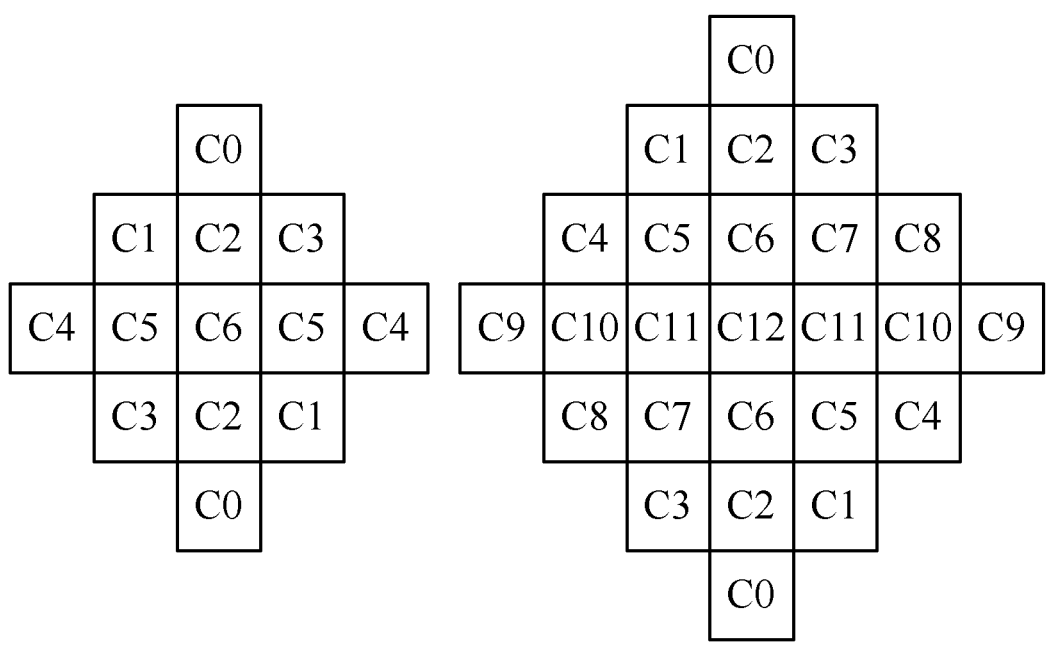
FIG. 5 shows a diagram of example diamond filter shapes for adaptive loop filters, according to some embodiments of the present disclosure.

ALF filter can be applied for grids, such as a 4×4 grid. In some systems (e.g., VVC or VTM7), based on the direction and activity of local gradients, the luma filter unit can be classified into one of 25 categories and a 7×7 diamond filter shape can be used. For each category, one set of filter parameters are signaled in adaptation parameter set ("APS"). For the chroma component, a 5×5 diamond filter shape can be used and eight sets of parameters can be signaled. FIG. 5 shows a diagram of example diamond filter shapes for adaptive loop filters, according to some embodiments of the present disclosure. As shown in FIG. 5, a 5×5 diamond filter shape is shown, which may be used for the chroma component. A 7λ7 diamond filter shape is also shown, which can be used for the luma component. Before filtering each 4×4 luma block, geometric transformations such as rotation or diagonal and vertical flipping can be applied to the filter coefficients and to the corresponding filter clipping values depending on gradient values calculated for that block. This may be equivalent to applying these transformations to the samples in the filter support region.

Convolutional neutral networks ("CNN") based image/video compression has become an active research area. For example, an end-to-end image compression can achieve competitive performance compared to conventional image compression approaches. An end-to-end learned video compression framework can utilize the optical flow to obtain the motion information and reconstruct the current frame. Other methods of learned video compression can incorporate neural networks into different functional blocks in a conventional video coding framework (e.g., intra-prediction, inter-prediction, transform, entropy coding and in-loop filtering).

The learning-based compression methods or CNN-based compression methods can learn extensive features of the compression artifacts with sufficient trainable parameters for the neural network, and minimize the distortion of compressed picture by mapping the correlation between the compressed picture and the original picture into a to-be-learned function. For example, a four-layer super-resolution CNN may be used to replace the SAO filter in the encoding process. Compared with a single-path CNN, a CNN with variable filter sizes can be helpful to extract features in different spatial scales, with less network complexity and accelerated training process. Furthermore, a multi-channel long-short-term dependency residual network can be used for mapping a distorted frame to its associated raw frame and can be inserted between a deblocking filter and an SAO filter. The CU and TU boundaries can also be exploited as a part of inputs to capture the artifacts more easily. Besides the local patch, the spatial and temporal information can be jointly exploited by taking both current block and co-located block in reference frame into consideration. A multi-frame in-loop filter for HEVC can enhance the visual quality of each encoded frame by leveraging its adjacent frames. An attention based dual-scale CNN can reduce compression artifacts, which also takes advantage of informative priors such as quantization parameters ("QPs") and partitioning information. A non-local attention network can be used for high-quality image restoration, which captures the long-range dependencies between pixels.

Figure 6A:
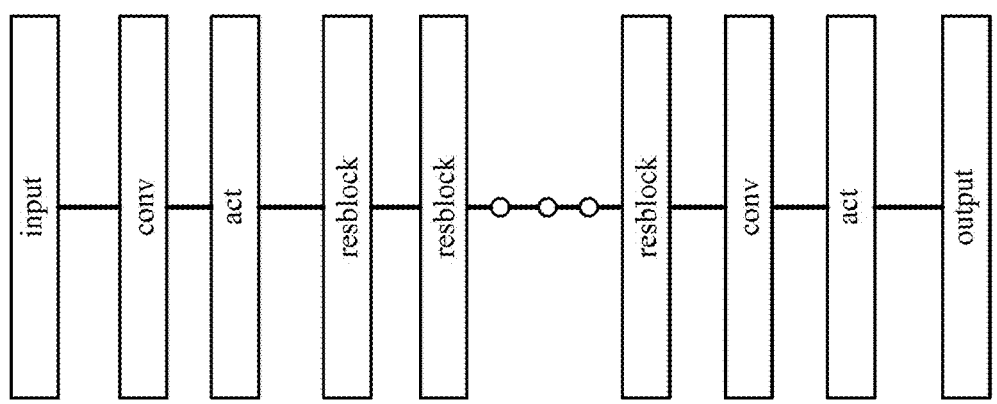
FIG. 6A shows a schematic of an example neural network architecture as in-loop filtering, according to some embodiments of the present disclosure.
Figure 6B:
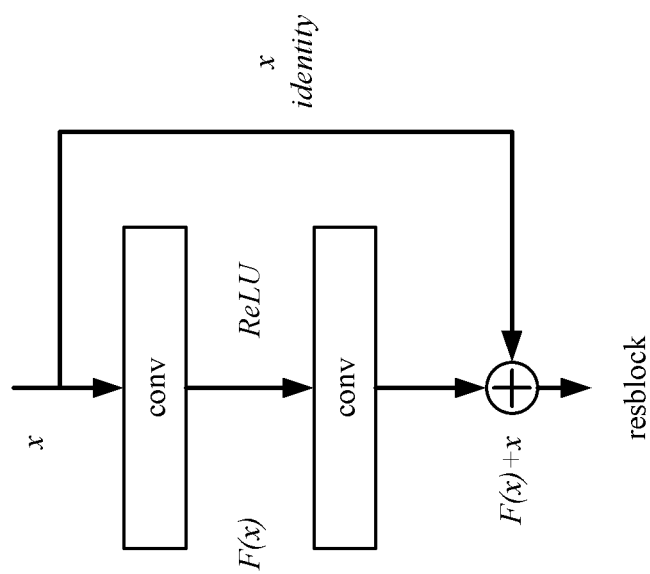
FIG. 6B shows a schematic of an example residual block, according to some embodiments of the present disclosure.

FIG. 6A shows a schematic of an example neural network architecture as in-loop filtering, according to some embodiments of the present disclosure. As shown in FIG. 6A, an input can be processed by a residual neural network ("ResNet") that includes a convolutional layer and one or more residual blocks ("ResBlocks") before generating an output. In some embodiments, the convolutional process can be conducted using full-resolution convolution, namely with a stride of 1. The full-resolution convolution can be used to preserve information of the original signal. FIG. 6B shows a schematic of an example residual block, according to some embodiments of the present disclosure. A ResBlock shown in FIG. 6B comprises two convolutional layers. In traditional neural networks, each layer feeds into a next layer. In the ResBlock shown in FIG. 6B, an additional connection (e.g., identity) can feed the input signal over one or more layers and allow the input signal to skip the one or more layers. It is appreciated that the ResBlock shown in FIG. 6B can be used in the neural network architecture shown in FIG. 6A.

While CNN-based compression methods can be capable of capturing features (e.g., artifact features) in the video signal and describing high-dimensional mappings, there can be two major drawbacks in adopting the CNN architecture directly. First, resolution adaptability can be an issue. Video resolution refers to a sampling density of the original signal. Video signals in different resolutions can have different degrees of sample correlation within a fixed neighborhood. As a result, a CNN trained on a specific resolution may not be suitable for video signals in other resolutions. Second, there can be a trade-off between spatially-precise representations and larger receptive fields (e.g., sampling size). Video compression may need precise signal information. As a result, down-sampling may be used with caution to avoid losing fine details in the video signal. However, full-resolution convolutional layer can be less effective in utilizing contextual information due to their limited receptive fields.

Figure 7:
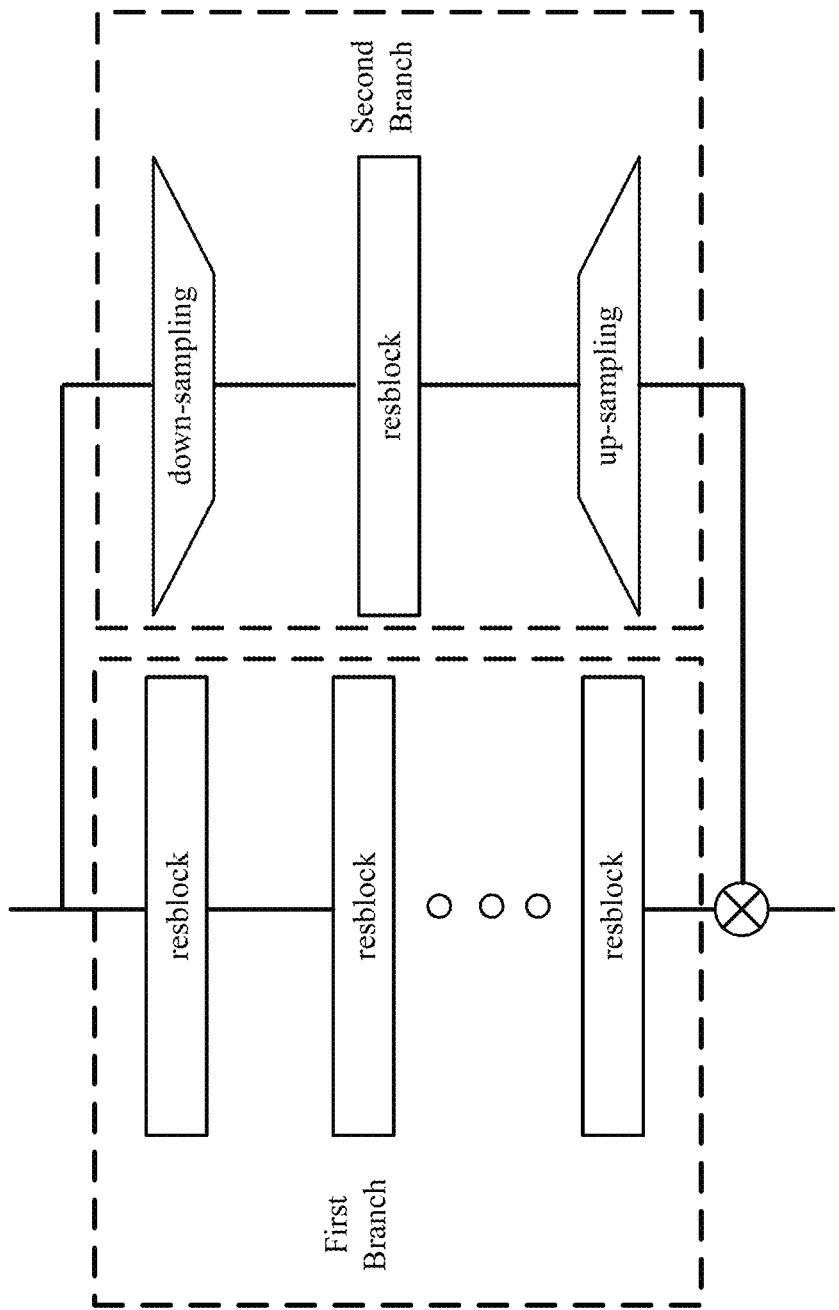
FIG. 7 shows a schematic of an example multi-density block of a neural network in-loop filtering, according to some embodiments of the present disclosure.

Embodiments of the present disclosure provide an improved neural network based in-loop filtering to solve the issues discussed above. To improve the resolution adaptability of the neural network (e.g., CNN) and enhance the learning ability, a novel multi-density block ("MDB") structure in a multi-density neural network is designed. FIG. 7 shows a schematic of an example multi-density block of a neural network in-loop filtering, according to some embodiments of the present disclosure. As shown in FIG. 7, MDB can include two branches. The first branch includes a basic branch maintaining full resolution for capturing spatially-precise representations. The second branch includes a density branch for learning richer spatial correlation with larger receptive field through down-sampling and up-sampling. Feature maps generated through the two branches can be merged into one stream. In some embodiments, the MDB shown in FIG. 7 can be applied after the LMCS filter and the deblocking filter.

In some embodiments, as shown in FIG. 7, the first branch can be similar to a ResNet (e.g., ResNet of FIG. 6B). The ResNet can comprise one or more ResBlocks. The second branch can include a down-sampling module, one or more ResBlocks, and an up-sampling module. In some embodiments, the density information is hidden inside the signal, but the density information can be learned from the mapping between the lower-resolution representations and the higher resolution or full-resolution representations. As a result, a down-sampling layer can be located before other modules (e.g., ResBlocks, up-sampling module, etc.) to obtain a lower resolution (e.g., half resolution) representation. In some embodiments, the lower resolution can be adjusted. For example, instead of a half resolution, the lower resolution can be a quarter resolution. In some embodiments, the down-sampling layer can be sequentially followed by a ResBlock and an up-sampling layer to generate density representations in the same size with the feature maps of the first branch.

In some embodiments, density representations from the second branch and the feature maps of the first branch can be merged. In some embodiments, the density representations and the feature maps can be merged using an element-wise product. For example, the density representations and the feature maps can include a same number of elements. As a result, an element-wise product can be performed to merge the density representation and the feature maps. In some embodiments, the density representations and the feature maps can be added together. For example, the first branch can comprise 64 channels as output, and the second branch can comprise 64 channels as output. When the two branches are merged together, the 64 channels from the first branch can be added to the 64 channels from the second branch to provide 128 channels as output for the MDB.

The MDB shown in FIG. 7 can provide flexibility in resolution adaptability. For example, the second branch shown in FIG. 7 provide a down-sampling or an up-sampling on the input signal prior to applying the ResBlock. As a result, the sampling can be adjusted accordingly to be more correlated with the training data used to train the MDB. Moreover, the first branch can still account for the finer details that may be lost in the second branch using higher-resolution or full-resolution convolutional layer. Therefore, in addition to the resolution adaptability, the MDB structure can also benefit from the combination of spatially-precise representation and larger receptive field by conducting higher resolution or full-resolution convolution in the first branch and the second branch respectively.

In some embodiments, the number of branches in the MDB structure shown in FIG. 7 can be flexible. For example, the MDB can include three branches. The first branch includes a basic branch maintaining full resolution for capturing spatially-precise representations. The second branch includes a density branch for learning richer spatial correlation with larger receptive field through a half down-sampling. The third branch includes another density branch with a larger receptive field through a quarter down-sampling. In some embodiments, density branches with up-sampled convolution can also be considered.

Figure 8:
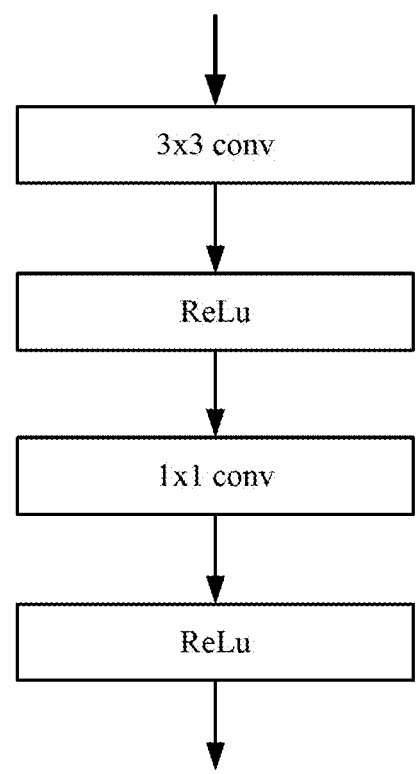
FIG. 8 shows a schematic of an example down-sampling module in a multi-density block, according to some embodiments of the present disclosure.

FIG. 8 shows a schematic of an example down-sampling module in a multi-density block, according to some embodiments of the present disclosure. As shown in FIG. 8, the down-sampling module can include a 3×3 convolution. It is appreciated that the size of the convolution can be flexible. For example, instead of the 3×3 convolution, the down-sampling module can include a 5×5 convolution. In some embodiments, the 3×3 convolution can be conducted with a stride of 2 to realize a half down-sampling. In some embodiments, after a rectified linear unit ("ReLU") activation, an additional 1×1 convolutional layer and another activation function (e.g., ReLU activation) can be applied to enhance the non-linearity learning. It is appreciated that the down-sampling module shown in FIG. 8 can be applied in the MDB shown in FIG. 7.

Figure 9:
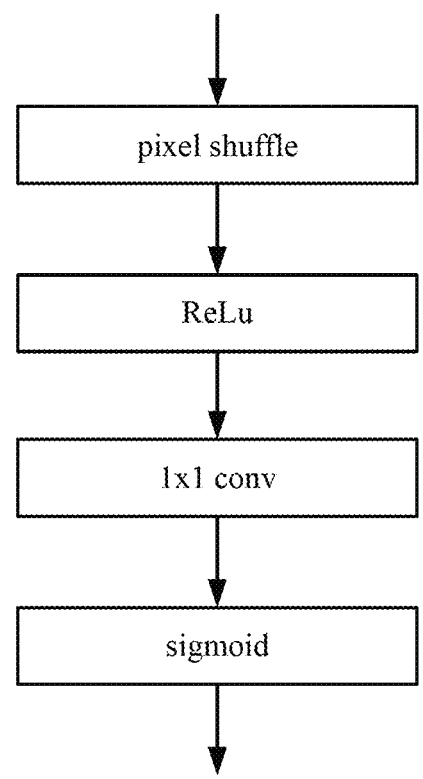
FIG. 9 shows a schematic of an example up-sampling module in a multi-density block, according to some embodiments of the present disclosure.

FIG. 9 shows a schematic of an example up-sampling module in a multi-density block, according to some embodiments of the present disclosure. As shown in FIG. 9, the up-sampling module can include a pixel-shuffle module. The pixel-shuffle module can enlarge the spatial resolution. The up-sampling module can further include a ReLU activation function, a 1×1 convolution, and another activation function following the 1×1 convolution. In some embodiments, the activation function is a sigmoid function. As a result, the density representation obtained after the up-sampling module can have values of 0 and 1. In some embodiments, the values of 0 and 1 for the density representation can be easily merged with results from another branch or other branches according to an element-wise product. As a result, the density representation can serve as a weight for each element in the results from other branches. A value of 1 can preserve the element value of the corresponding element in the results, and a value of 0 can clear the value of the corresponding element in the results. It is appreciated that the up-sampling module shown in FIG. 9 can be applied in the MDB shown in FIG. 7.

In some embodiments, the ReLU activation functions shown in FIG. 8 and FIG. 9 can be replaced with other activation functions, such as parametric rectified linear unit ("PReLU"). In some embodiments, the number of convolutional layers in the down-sampling module and the up-sampling module can be flexible. For example, there can be three convolutional layers between the pixel-shuffle module and the 1×1 convolutional layer in the up-sampling module shown in FIG. 9. In some embodiments, the kernel size for the convolutional layers can be flexible (e.g., 3×3, 5×5, etc.).

Figure 10:
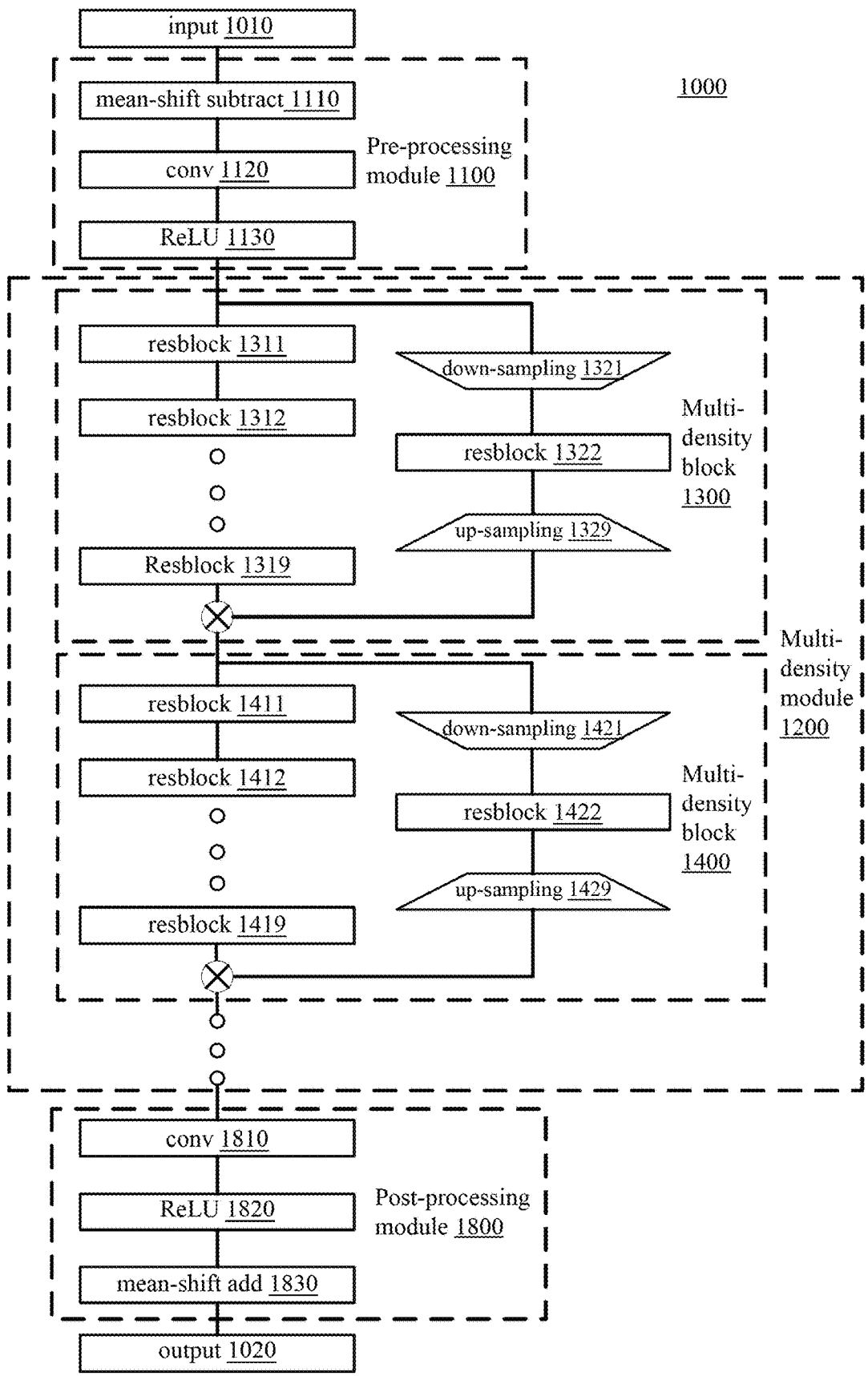
FIG. 10 shows a schematic of an example neural network based on a multi-density block, according to some embodiments of the present disclosure.

FIG. 10 shows a schematic of an example neural network based on a multi-density block, according to some embodiments of the present disclosure. As shown in FIG. 10, a neural network 1000 (e.g., a multi-density neural network) can include a pre-processing module 1100, a multi-density module 1200 (e.g., one or more MDBs shown in FIG. 7), and a post-processing module 1800. Multi-density module 1200 can include one or more MDBs (e.g., MDB 1300 and MDB 1400). In some embodiments, pre-processing module 1100 includes a first hidden layer, which can be a mean-shift subtraction layer 1110. Mean-shift subtraction layer 1110 can process input signal 1010 (e.g., video signal or image signal) by subtracting a mean value to reduce data diversity. Successively, a convolutional layer 1120 and a ReLU activation layer 1130 are concatenated, which can convert the input signal into lower-level feature maps.

In some embodiments, post-processing module 1800 can be symmetric to pre-processing module 1100. For example, symmetric to pre-processing module 1100, post-processing module 1800 can also include a convolutional layer 1810, a ReLU activation layer 1820, and a mean-shift adding layer 1830, where mean-shift adding layer 1830 corresponds to mean-shift subtraction layer 1110 in pre-processing module 1100. In some embodiments, the mapping relationships between the initial feature maps of the input and the feature maps before output are mainly learned through multi-density module 1200. In some embodiments, pre-processing module 1100 and post-processing module 1800 can be modified according to different targets for neural network 1000. In some embodiments, the number of MDBs in multi-density module 1200 is also adjustable. For example, as shown in FIG. 10, multi-density module 1200 comprises two MDBs 1300 and 1400. The number of branches and the number of ResBlocks in each branch can be individually adjusted. It is appreciated that each of the modules shown in FIG. 7, FIG. 8, FIG. 9, and FIG. 10 can include circuitries.

Figure 11:
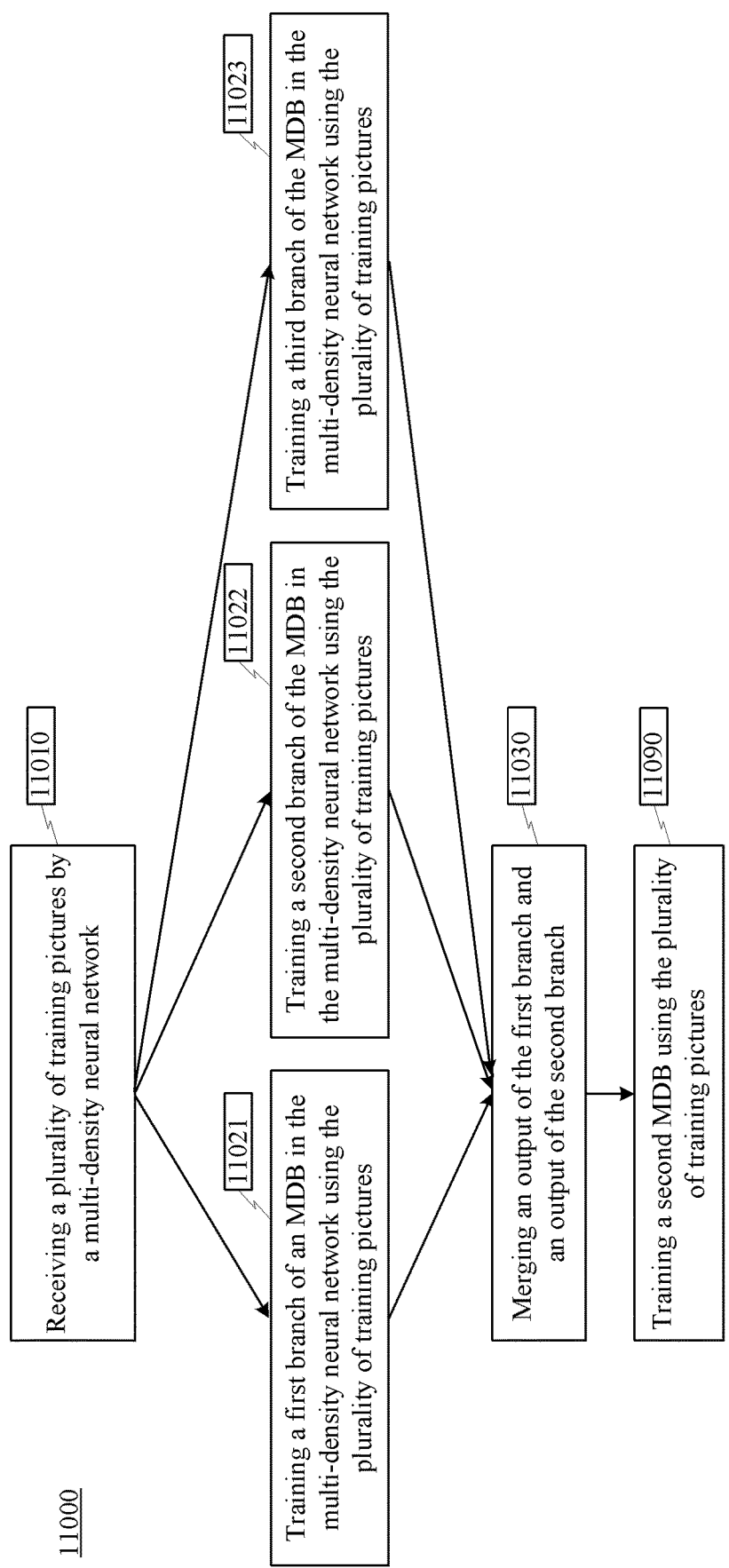
FIG. 11 shows a flowchart of an example method for performing training of a neural network in video processing, according to some embodiments of the present disclosure.

Embodiments of the present disclosure further provide methods for performing training of a neural network in video processing. FIG. 11 shows a flowchart of an example method for performing training of a neural network in video processing, according to some embodiments of the present disclosure. It is appreciated that method 11000 shown in FIG. 11 can be executed on neural network 1000 shown in FIG. 10.

In step S11010, a plurality of training pictures are received. The plurality of training pictures can be used to train one or more ResBlocks in the neural network. The neural network is configured to reduce block artifacts in video compression. In some embodiments, the neural network can comprise one or more MDBs. For example, neural network 1000 shown in FIG. 10 comprises two MDBs 1300 and 1400, and each of the MDBs 1300 and 1400 comprises one or more ResBlocks.

In step S11021, a first branch of an MDB in the neural network is trained using the plurality of training pictures. In some embodiments, the first branch comprises one or more ResBlocks. In some embodiments, the first branch does not include either a down-sampling processing or an up-sampling processing. For example, the MDB shown in FIG. 7 comprises a first branch that includes a basic branch for maintaining full resolution for capturing spatially-precise representations. The first branch shown in FIG. 7 comprises one or more ResBlocks.

In step S11022, a second branch of the MDB in the neural network is trained using the plurality of training pictures. In some embodiments, the second branch comprises a down-sampling processing, an up-sampling processing, and one or more residual blocks. For example, the MDB shown in FIG. 7 comprises a second branch that includes a density branch for learning richer spatial correlation with larger receptive field through down-sampling and up-sampling. The second branch shown in FIG. 7 comprises a down-sampling module, one or more ResBlocks, and an up-sampling module.

In some embodiments, the down-sampling processing of the second branch in step S11022 can comprise one or more convolutional layers and one or more activation functions. For example, the down-sampling module shown in FIG. 8 comprises a 3×3 convolution. The 3×3 convolution can be conducted with a stride of 2 to realize a half down-sampling. The down-sampling module shown in FIG. 8 can further include a rectified linear unit ("ReLU") activation and an additional 1×1 convolutional layer while another activation function (e.g., ReLU activation) can be applied to enhance the non-linearity learning.

In some embodiments, the up-sampling processing of the second branch in step S11022 can comprise one or more convolutional layers and one or more activation functions including a sigmoid function. For example, the up-sampling module shown in FIG. 9 comprises a pixel-shuffle module, an ReLU activation function, a 1×1 convolution, and a sigmoid activation function following the 1×1 convolution. As a result, the density representation obtained after the up-sampling module shown in FIG. 9 can have values of 0 and 1.

Referring back to FIG. 11, in some embodiments, in addition to steps S11010, S11021, and S11022, step S11023 can be performed. In step S11023, a third branch of the MDB in the neural network is trained using the plurality of training pictures. In some embodiments, the third branch comprise a down-sampling processing, an up-sampling processing, and one or more residual blocks, and the sampling size in the third branch is different from a sampling size of the down-sampling processing of the second branch. For example, although not explicitly shown in FIG. 7, the MDB of FIG. 7 can further include a third branch similar to the second branch, except the sampling size is different for the down-sampling and the up-sampling. A different sampling size can achieve an alternative balance between spatially-precise representations and receptive fields. In some embodiments, in step 11023, a plurality of additional branches of the MDB can be trained using the plurality of training pictures.

In some embodiments, in addition to steps S11010, S11021, S11022, and S11023, step S11030 can be executed. In step S11030, an output of the first branch and an output of the second branch can be merged together. In some embodiments, the outputs of the first branch and the second branch can be merged by performing an element-wise dot product. For example, in the MDB shown in FIG. 7, the output of the first branch on the bottom is merged with the output of the second branch on the top through an element-wise dot product. In some embodiments, the density representation obtained after the up-sampling module can have values of 0 and 1 and the values of 0 and 1 for the density representation can be easily merged with results from other branch or branches according to an element-wise product. As a result, the density representation can serve as a weight for each element in the results from other branches. A value of 1 can preserve the element value of the corresponding element in the results, and a value of 0 can clear the value of the corresponding element in the results. In some embodiments, if there are additional branches, the output of the additional branches can be similarly merged into the output of the first branch and the second branch.

In some embodiments, in addition to steps S11010, S11021, S11022, S11023, and S11030, step S11090 can be performed. In step S11090, a second MDB is trained using the plurality of training pictures. For example, as shown in FIG. 10, in addition to MDB 1300, another MDB 1400 following MDB 1300 can be trained. In some embodiments, in step S11090, a plurality of additional MDBs can be trained using the plurality of training pictures.

Figure 12:
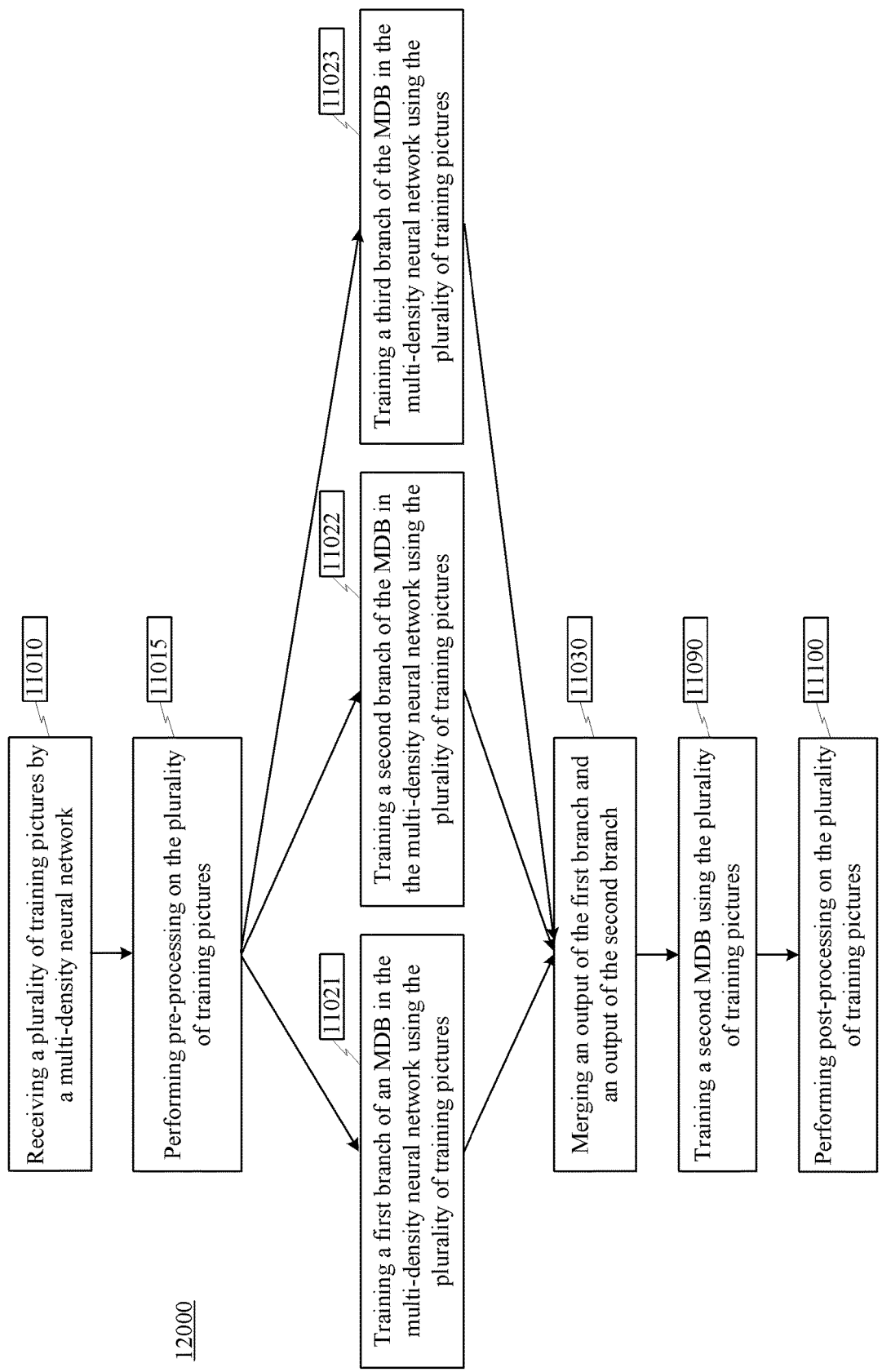
FIG. 12 shows a flowchart of an example method for performing training of a neural network including pre-processing and post-processing, according to some embodiments of the present disclosure.

Embodiments of the present disclosure further provide methods for performing training of a neural network in video processing with pre-processing and post-processing. FIG. 12 shows a flowchart of an example method for performing training of a neural network including pre-processing and post-processing, according to some embodiments of the present disclosure. In addition to the steps of method 11000 shown in FIG. 11, method 12000 shown in FIG. 12 can include additional steps of S11015 and S11100. It is appreciated that method 12000 shown in FIG. 12 can be executed on neural network 1000 shown in FIG. 10.

After step S11010, in step S11015, a pre-processing can be performed on the plurality of training pictures. For example, as shown in FIG. 10, pre-processing module 1100 can be included prior to the MDBs (e.g., MDB 1300 and MDB 1400 of FIG. 10). In some embodiments, the pre-processing can include a first hidden layer, which can be a mean-shift subtraction layer (e.g., mean-shift subtraction layer 1110 of FIG. 10). Successively, a convolutional layer and an activation layer can be concatenated to convert the training pictures into lower-level feature maps.

In step S11100, a post-processing can be performed on the plurality of training pictures. For example, as shown in FIG. 10, post-processing module 1800 can be included after the MDBs (e.g., MDB 1300 and MDB 1400 of FIG. 10). In some embodiments, the post-processing can be symmetric to the pre-processing. For example, as shown in FIG. 10, post-processing module 1800 is symmetric to pre-processing module 1100, and post-processing module 1800 can include mean-shift adding layer 1830 that corresponds to main-shift subtraction layer 1110 in pre-processing module 1100.

Figure 13:
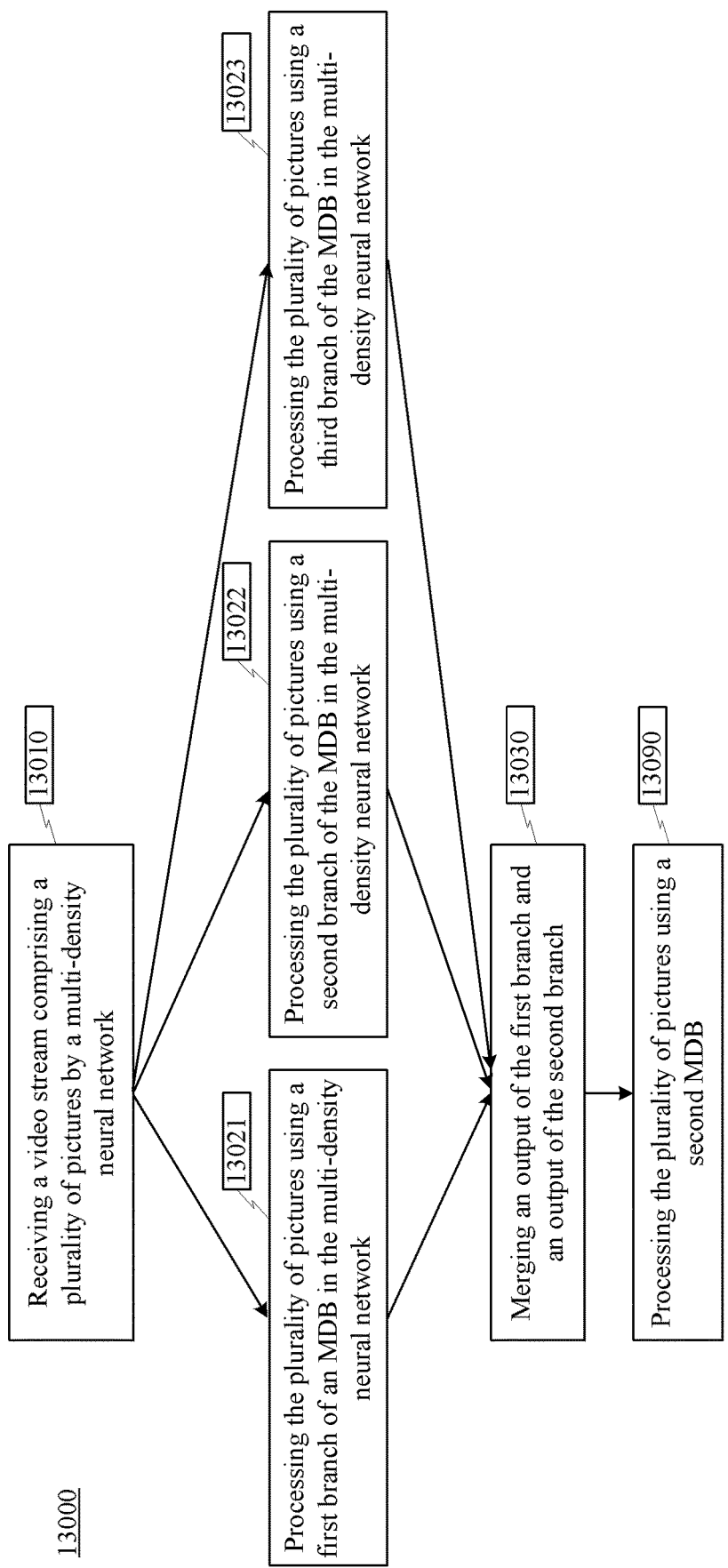
FIG. 13 shows a flowchart of an example method for using a neural network in video processing, according to some embodiments of the present disclosure.

Embodiments of the present disclosure further methods for performing executing of a neural network in video processing. FIG. 13 shows a flowchart of an example method for using a neural network in video processing, according to some embodiments of the present disclosure. It is appreciated that method 13000 shown in FIG. 13 can be executed on neural network 1000 shown in FIG. 10.

In step S13010, a video stream comprising a plurality of pictures is received. The neural network is configured to reduce blocking artifacts in video compression of the video stream. In some embodiments, the neural network can comprise one or more MDBs. For example, neural network 1000 shown in FIG. 10 comprises two MDBs 1300 and 1400, and each of the MDBs 1300 and 1400 comprises one or more ResBlocks.

In step S13021, the plurality of pictures is processed using a first branch of an MDB in the neural network. In some embodiments, the first branch comprises one or more ResBlocks. In some embodiments, the first branch does not include either a down-sampling processing or an up-sampling processing. For example, the MDB shown in FIG. 7 comprises a first branch that includes a basic branch for maintaining full resolution for capturing spatially-precise representations. The first branch shown in FIG. 7 comprises one or more ResBlocks.

In step S13022, the plurality of pictures is processed using a second branch of the MDB in the neural network. In some embodiments, the second branch comprises a down-sampling processing, an up-sampling processing, and one or more residual blocks. For example, the MDB shown in FIG. 7 comprises a second branch that includes a density branch for learning richer spatial correlation with larger receptive field through down-sampling and up-sampling. The second branch shown in FIG. 7 comprises a down-sampling module, one or more ResBlocks, and an up-sampling module.

In some embodiments, the down-sampling processing of the second branch in step S13022 can comprise one or more convolutional layers and one or more activation functions. For example, the down-sampling module shown in FIG. 8 comprises a 3×3 convolution. The 3×3 convolution can be conducted with a stride of 2 to realize a half down-sampling. The down-sampling module shown in FIG. 8 can further include a rectified linear unit ("ReLU") activation, an additional 1×1 convolutional layer and another activation function (e.g., ReLU activation) can be applied to enhance the non-linearity learning.

In some embodiments, the up-sampling processing of the second branch in step S13022 can comprise one or more convolutional layers and one or more activation functions including a sigmoid function. For example, the up-sampling module shown in FIG. 9 comprises a pixel-shuffle module, an ReLU activation function, a 1×1 convolution, and a sigmoid activation function following the 1×1 convolution. As a result, the density representation obtained after the up-sampling module shown in FIG. 9 can have values of 0 and 1.

Referring back to FIG. 13, in some embodiments, in addition to steps S13010, S13021, and S13022, step S13023 can be performed. In step S13023, the plurality of pictures can be processed using a third branch of the MDB in the neural network. In some embodiments, the third branch comprise a down-sampling processing, an up-sampling processing, and one or more residual blocks, and the sampling size in the third branch is different from a sampling size of the down-sampling processing of the second branch. For example, although not explicitly shown in FIG. 7, the MDB of FIG. 7 can further include a third branch similar to the second branch, except the sampling size is different for the down-sampling and the up-sampling. A different sampling size can achieve an alternative balance between spatially-precise representations and receptive fields. In some embodiments, in step 13023, the plurality of pictures can be processed using a plurality of additional branches of the MDB.

In some embodiments, in addition to steps S13010, S13021, S13022, and S13023, step S13030 can be executed. In step S13030, an output of the first branch and an output of the second branch can be merged together. In some embodiments, the outputs of the first branch and the second branch can be merged by performing an element-wise dot product. For example, in the MDB shown in FIG. 7, the output of the first branch on the bottom is merged with the output of the second branch on the top through an element-wise dot product. In some embodiments, the density representation obtained after the up-sampling module can have values of 0 and 1 and the values of 0 and 1 for the density representation can be easily merged with results from other branch or branches according to an element-wise product. As a result, the density representation can serve as a weight for each element in the results from other branches. A value of 1 can preserve the element value of the corresponding element in the results, and a value of 0 can clear the value of the corresponding element in the results. In some embodiments, if there are additional branches, the output of the additional branches can be similarly merged into the output of the first branch and the second branch.

In some embodiments, in addition to steps S13010, S13021, S13022, S13023, and S13030, step S13090 can be performed. In step S13090, the plurality of pictures can be processed using a second MDB. For example, as shown in FIG. 10, in addition to MDB 1300, another MDB 1400 following MDB 1300 can be used to process the plurality of pictures. In some embodiments, in step S13090, the plurality of pictures can be processed using a plurality of additional MDBs.

Figure 14:
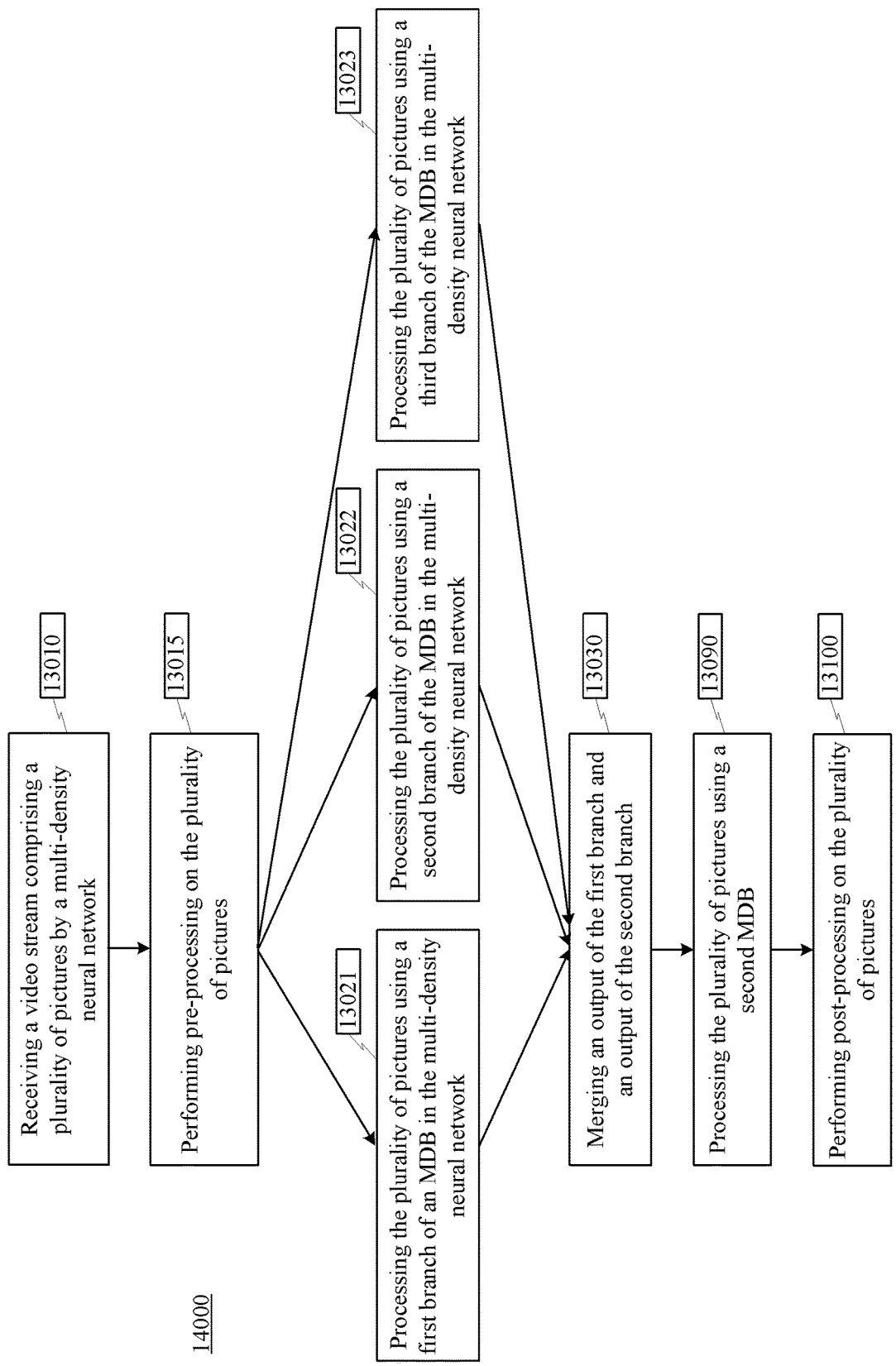
FIG. 14 shows a flowchart of an example method for using a neural network including pre-processing and post-processing, according to some embodiments of the present disclosure.

Embodiments of the present disclosure further provide methods for using a neural network in video processing with pre-processing and post-processing. FIG. 14 shows a flowchart of an example method for using a neural network including pre-processing and post-processing, according to some embodiments of the present disclosure. In addition to the steps of method 13000 shown in FIG. 13, method 14000 shown in FIG. 14 can include additional steps of S13015 and S13100. It is appreciated that method 14000 shown in FIG. 14 can be executed on neural network 1000 shown in FIG. 10.

Before step S13010, in step S13015, a pre-processing can be performed on the plurality of pictures. For example, as shown in FIG. 10, pre-processing module 1100 can be included prior to the MDBs 1300 and 1400. In some embodiments, the pre-processing can include a first hidden layer, which can be a mean-shift subtraction layer. Successively, a convolutional layer and an activation layer can be concatenated to convert the plurality of pictures into lower-level feature maps.

In step S13100, a post-processing can be performed on the plurality of pictures. For example, as shown in FIG. 10, post-processing module 1800 can be included after MDBs 1300 and 1400. In some embodiments, the post-processing can be symmetric to the pre-processing. For example, as shown in FIG. 10, post-processing module 1800 is symmetric to pre-processing module 1100, and post-processing module 1800 can include mean-shift adding layer 1830 that corresponds to main-shift subtraction layer 1110 in pre-processing module 1100.

In some embodiments, a non-transitory computer-readable storage medium including instructions is also provided, and the instructions may be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above-described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. One of ordinary skill in the art will also understand that multiple ones of the above-described modules/units may be combined as one module/unit, and each of the above described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

The embodiments may further be described using the following clauses:

1. A method for training a neural network in video processing, comprising:
receiving a plurality of training pictures;
training a first branch of a first block in the neural network using the plurality of training pictures, wherein the neural network is configured to reduce blocking artifacts in video compression and the first branch comprises one or more residual blocks; and
training a second branch of the first block in the neural network using the plurality of training pictures, wherein the second branch comprises a down-sampling processing, an up-sampling processing, and one or more residual blocks.

2. The method according to clause 1, further comprising:
merging an output of the first branch of the first block and an output of the second branch of the first block.

3. The method according to clause 2, wherein merging the output of the first branch of the first block and the output of the second branch of the first block further comprising:
performing an element-wise dot product on the output of the first branch and the output of the second branch.

4. The method according to any one of clauses 1-3, wherein:
the down-sampling processing of the second branch comprises one or more convolutional layers including a 1×1 convolutional layer, and one or more activation functions; and
the up-sampling processing of the second branch comprises one or more convolutional layers including a 1×1 convolutional layer, and one or more activation functions including a sigmoid function.

5. The method according to any one of clauses 1-4, further comprising:
training a third branch of the first block of the neural network using the plurality of training pictures, wherein the third branch comprises a down-sampling processing, an up-sampling processing, and one or more residual blocks, and the down-sampling processing of the third branch has a sampling size that is different from a sampling size of the down-sampling processing of the second branch.

6. The method according to any one of clauses 1-5, further comprising:
training a second block of the neural network, wherein the second block comprises a plurality of branches.

7. The method according to any one of clauses 1-6, further comprising:
performing pre-processing on the training pictures, wherein the pre-processing comprises performing a mean-shift subtraction on the training pictures; and
performing post-processing on the training pictures, wherein the post-processing comprise a mean-shift add on the training pictures and the mean-shift add corresponds to the mean-shift subtraction in the pre-processing.

8. A method for using a neural network in video processing, comprising:
receiving a video stream comprising a plurality of pictures;
processing the plurality of pictures using a first branch of a first block in the neural network, wherein the neural network is configured to reduce blocking artifacts in video compression of the video stream and the first branch comprises one or more residual blocks; and
processing the plurality of pictures using a second branch of the first block in the neural network, wherein the second branch comprises a down-sampling processing, an up-sampling processing, and one or more residual blocks.

9. The method according to clause 8, further comprising:
merging an output of the first branch of the first block and an output of the second branch of the first block.

10. The method according to clause 9, wherein merging the output of the first branch of the first block and the output of the second branch of the first block further comprising:
performing an element-wise dot product on the output of the first branch and the output of the second branch.

11. The method according to any one of clauses 8-10, wherein:
the down-sampling processing of the second branch comprises one or more convolutional layers including a 1×1 convolutional layer, and one or more activation functions; and
the up-sampling processing of the second branch comprises one or more convolutional layers including a 1×1 convolutional layer, and one or more activation functions including a sigmoid function.

12. The method according to any one of clauses 8-11, further comprising:
processing the plurality of pictures using a third branch of the first block of the neural network, wherein the third branch comprises a down-sampling processing, an up-sampling processing, and one or more residual blocks, and the down-sampling processing of the third branch has a sampling size that is different from a sampling size of the down-sampling processing of the second branch.

13. The method according to any one of clauses 8-12, further comprising:
processing the plurality of pictures using a second block of the neural network, wherein the second block comprises a plurality of branches.

14. The method according to any one of clauses 8-13, further comprising:
performing pre-processing on the plurality of pictures, wherein the pre-processing comprises performing a mean-shift subtraction on the plurality of pictures; and
performing post-processing on the plurality of pictures, wherein the post-processing comprise a mean-shift add on the training pictures and the mean-shift add corresponds to the mean-shift subtraction in the pre-processing.

15. A system for training a neural network in video processing, the system comprising:
a memory storing a set of instructions; and
a processor configured to execute the set of instructions to cause the system to perform:
receiving a plurality of training pictures;
training a first branch of a first block in the neural network using the plurality of training pictures, wherein the neural network is configured to reduce blocking artifacts in video compression and the first branch comprises one or more residual blocks; and
training a second branch of the first block in the neural network using the plurality of training pictures, wherein the second branch comprises a down-sampling processing, an up-sampling processing, and one or more residual blocks.

16. The system according to clause 15, wherein the processor is further configured to execute the set of instructions to cause the system to perform:
merging an output of the first branch of the first block and an output of the second branch of the first block.

17. A system for using a neural network in video processing, the system comprising:
a memory storing a set of instructions; and
a processor configured to execute the set of instructions to cause the system to perform:
receiving a video stream comprising a plurality of pictures;
processing the plurality of pictures using a first branch of a first block in the neural network, wherein the neural network is configured to reduce blocking artifacts in video compression of the video stream and the first branch comprises one or more residual blocks; and processing the plurality of pictures using a second branch of the first block in the neural network, wherein the second branch comprises a down-sampling processing, an up-sampling processing, and one or more residual blocks.

18. The system according to clause 17, wherein the processor is further configured to execute the set of instructions to cause the system to perform:

merging an output of the first branch of the first block and an output of the second branch of the first block.

19. A non-transitory computer readable medium that stores a set of instructions that is executable by one or more processors of an apparatus to cause the apparatus to initiate a method for performing training of a neural network in video processing, the method comprising:

receiving a plurality of training pictures;

training a first branch of a first block in the neural network using the plurality of training pictures, wherein the neural network is configured to reduce blocking artifacts in video compression and the first branch comprises one or more residual blocks; and training a second branch of the first block in the neural network using the plurality of training pictures, wherein the second branch comprises a down-sampling processing, an up-sampling processing, and one or more residual blocks.

20. A non-transitory computer readable medium that stores a set of instructions that is executable by one or more processors of an apparatus to cause the apparatus to initiate a method for performing training of a neural network in video processing, the method comprising:

receiving a video stream comprising a plurality of pictures;

processing the plurality of pictures using a first branch of a first block in the neural network, wherein the neural network is configured to reduce blocking artifacts in video compression of the video stream and the first branch comprises one or more residual blocks; and processing the plurality of pictures using a second branch of the first block in the neural network, wherein the second branch comprises a down-sampling processing, an up-sampling processing, and one or more residual blocks.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A method for using a neural network in video processing, comprising:

receiving a video stream comprising a plurality of pictures;

processing the plurality of pictures using a first branch of a first block in the neural network, wherein the neural network is configured to reduce blocking artifacts in video compression of the video stream and the first branch comprises one or more residual blocks and the first branch is configured to maintain full resolution;

processing the plurality of pictures using a second branch of the first block in the neural network, wherein the second branch comprises a down-sampling processing, an up-sampling processing, and one or more residual blocks; and merging an output of the first branch of the first block and an output of the second branch of the first block.

2. The method according to claim 1, wherein merging the output of the first branch of the first block and the output of the second branch of the first block further comprising:

performing an element-wise dot product on the output of the first branch and the output of the second branch.

3. The method according to claim 1, wherein:

the down-sampling processing of the second branch comprises one or more convolutional layers including a 1×1 convolutional layer, and one or more activation functions; and the up-sampling processing of the second branch comprises one or more convolutional layers including a 1×1 convolutional layer, and one or more activation functions including a sigmoid function.

4. The method according to claim 1, further comprising:

processing the plurality of pictures using a third branch of the first block of the neural network, wherein the third branch comprises a down-sampling processing, an up-sampling processing, and one or more residual blocks, and the down-sampling processing of the third branch has a sampling size that is different from a sampling size of the down-sampling processing of the second branch.

5. The method according to claim 1, further comprising:

processing the plurality of pictures using a second block of the neural network, wherein the second block comprises a plurality of branches.

6. The method according to claim 1, further comprising:

performing pre-processing on the plurality of pictures, wherein the pre-processing comprises performing a mean-shift subtraction on the plurality of pictures; and performing post-processing on the plurality of pictures, wherein the post-processing comprises a mean-shift add on training pictures and the mean-shift add corresponds to the mean-shift subtraction in the pre-processing.

7. A system for using a neural network in video processing, the system comprising:

a memory storing a set of instructions; and a processor configured to execute the set of instructions to cause the system to perform:

receiving a video stream comprising a plurality of pictures;

processing the plurality of pictures using a first branch of a first block in the neural network, wherein the neural network is configured to reduce blocking artifacts in video compression of the video stream, the first branch comprises one or more residual blocks and the first branch is configured to maintain full resolution;

processing the plurality of pictures using a second branch of the first block in the neural network, wherein the second branch comprises a down-sampling processing, an up-sampling processing, and one or more residual blocks; and merging an output of the first branch of the first block and an output of the second branch of the first block.

8. The system according to claim 7, wherein the processor is further configured to execute the set of instructions to cause the system to perform:

performing an element-wise dot product on the output of the first branch and the output of the second branch.

9. The system according to claim 7, wherein:
the down-sampling processing of the second branch comprises one or more convolutional layers including a 1×1 convolutional layer, and one or more activation functions; and
the up-sampling processing of the second branch comprises one or more convolutional layers including a 1×1 convolutional layer, and one or more activation functions including a sigmoid function.

10. The system according to claim 7, wherein the processor is further configured to execute the set of instructions to cause the system to perform:
processing the plurality of pictures using a third branch of the first block of the neural network, wherein the third branch comprises a down-sampling processing, an up-sampling processing, and one or more residual blocks, and the down-sampling processing of the third branch has a sampling size that is different from a sampling size of the down-sampling processing of the second branch.

11. The system according to claim 7, wherein the processor is further configured to execute the set of instructions to cause the system to perform:
processing the plurality of pictures using a second block of the neural network, wherein the second block comprises a plurality of branches.

12. The system according to claim 7, wherein the processor is further configured to execute the set of instructions to cause the system to perform:
performing pre-processing on the plurality of pictures, wherein the pre-processing comprises performing a mean-shift subtraction on the plurality of pictures; and
performing post-processing on the plurality of pictures, wherein the post-processing comprises a mean-shift add on training pictures and the mean-shift add corresponds to the mean-shift subtraction in the pre-processing.

13. A non-transitory computer readable medium that stores a set of instructions that is executable by one or more processors of an apparatus to cause the apparatus to initiate a method for performing training of a neural network in video processing, the method comprising:
receiving a video stream comprising a plurality of pictures;
processing the plurality of pictures using a first branch of a first block in the neural network, wherein the neural network is configured to reduce blocking artifacts in video compression of the video stream, the first branch comprises one or more residual blocks and the first branch is configured to maintain full resolution;
processing the plurality of pictures using a second branch of the first block in the neural network, wherein the second branch comprises a down-sampling processing, an up-sampling processing, and one or more residual blocks; and
merging an output of the first branch of the first block and an output of the second branch of the first block.

14. The non-transitory computer readable medium of claim 13, wherein the method further comprises:
performing an element-wise dot product on the output of the first branch and the output of the second branch.

15. The non-transitory computer readable medium of claim 13, wherein:
the down-sampling processing of the second branch comprises one or more convolutional layers including a 1×1 convolutional layer, and one or more activation functions; and
the up-sampling processing of the second branch comprises one or more convolutional layers including a 1×1 convolutional layer, and one or more activation functions including a sigmoid function.

16. The non-transitory computer readable medium of claim 13, wherein the method further comprises:
processing the plurality of pictures using a third branch of the first block of the neural network, wherein the third branch comprises a down-sampling processing, an up-sampling processing, and one or more residual blocks, and the down-sampling processing of the third branch has a sampling size that is different from a sampling size of the down-sampling processing of the second branch.

17. The non-transitory computer readable medium of claim 13, wherein the method further comprises:
processing the plurality of pictures using a second block of the neural network, wherein the second block comprises a plurality of branches.

* * * * *